United States Patent
Umehara

(12) 
(10) Patent No.: US 6,773,742 B1
(45) Date of Patent: Aug. 10, 2004

(54) PATTERNED BOILED EGG AND PROCESS FOR PRODUCING THE SAME

(76) Inventor: Hatsuyo Umehara, 5466-7, Ooaza-Inabe, Ina-shi, Nagano (JP), 396-0011

( * ) Notice: Subject to any disclaimer, the term of this patent is extended or adjusted under 35 U.S.C. 154(b) by 0 days.

(21) Appl. No.: 09/889,119
(22) PCT Filed: Dec. 9, 1999
(86) PCT No.: PCT/JP99/06926
§ 371 (c)(1), (2), (4) Date: Jul. 10, 2001
(87) PCT Pub. No.: WO00/41577
PCT Pub. Date: Jul. 20, 2000

(30) Foreign Application Priority Data

Jan. 11, 1999 (JP) ............................................ 11-042063

(51) Int. Cl.[7] ................................................. A23L 1/32
(52) U.S. Cl. ....................................... 426/614; 426/104
(58) Field of Search .................................. 426/614, 104

(56) References Cited

U.S. PATENT DOCUMENTS 4,980,183 A * 12/1990 Johnson

FOREIGN PATENT DOCUMENTS

JP 60-237965 * 11/1985
JP 7-52600 * 2/1995

* cited by examiner

Primary Examiner—Anthony Weier
(74) Attorney, Agent, or Firm—Cook,Alex,McFarron, Manzo,Cummings & Mehler, Ltd.

(57) ABSTRACT

The curved surface inside the egg shell of an edible boiled egg is decorated by patterning so as to satisfy consumes' needs for a tasteful table setting. The pattern is formed by using exclusively the inherent components of the egg without introducing any foreign matter thereinto, which causes no fear from the viewpoint of food sanitation management. On the albumen layer (9b or 21a), serving as the background, which has been formed by the coagulation of the albumen (3c) on the curved surface of the boiled egg, a pattern layer (19a) is formed by the coagulation of the yolk (3g). On the yolk layer (9a or 3gf), serving as the background, which has been formed by the coagulation of the yolk (3g) on the curved surface of the boiled egg, a pattern layer (3e) is formed by the coagulation of the albumen. These pattern layers (19a and 3e) are formed by site-selectively and intensively heating the outer surface of the egg shell (3d).

16 Claims, 15 Drawing Sheets

FIG. 1
(A)
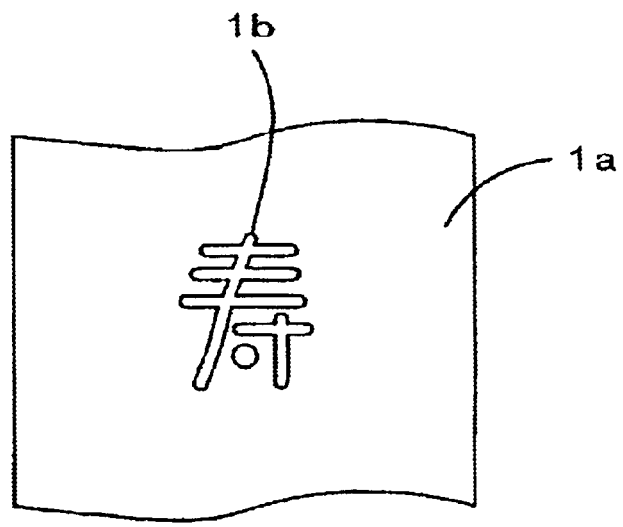
(B)
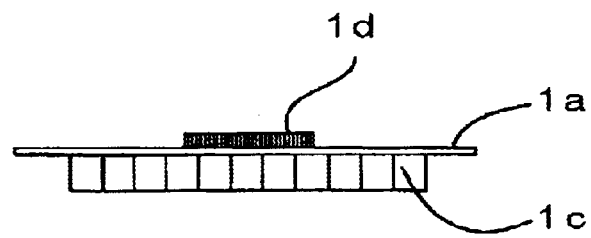
(C)
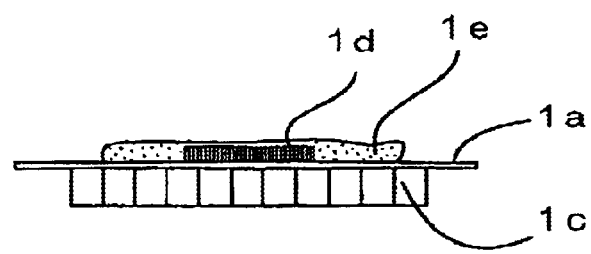
(D)
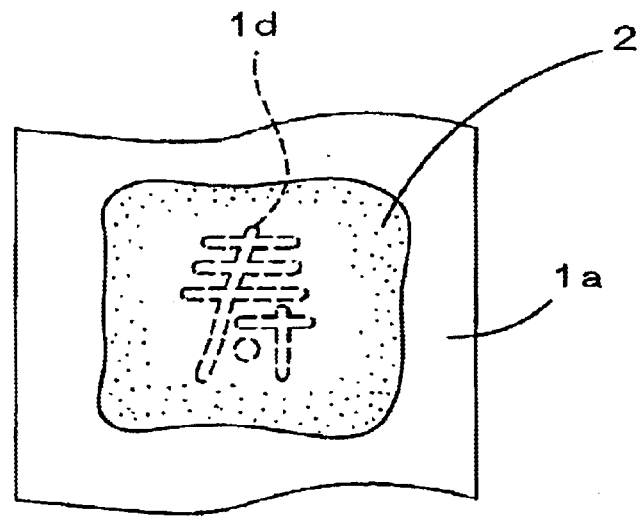

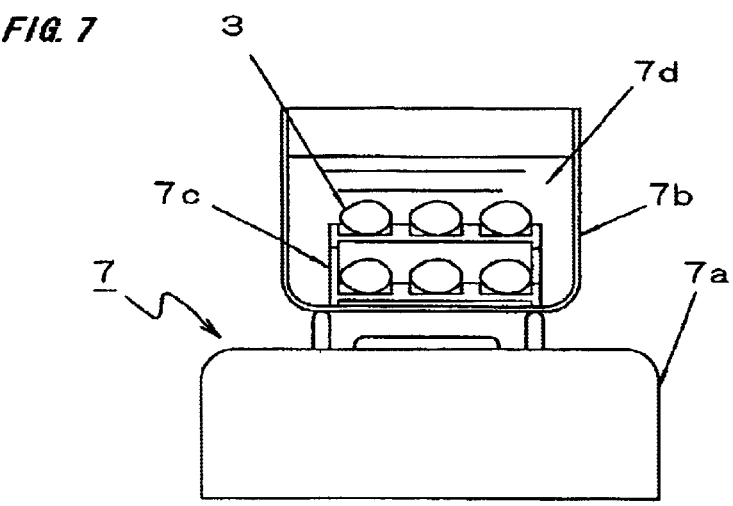
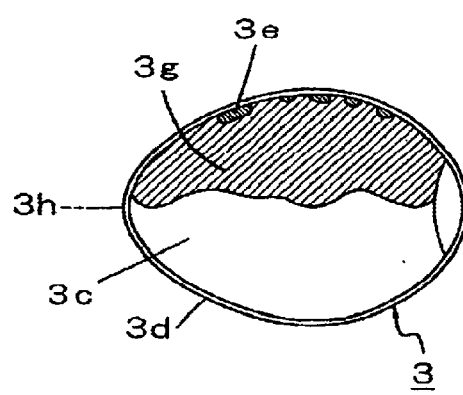
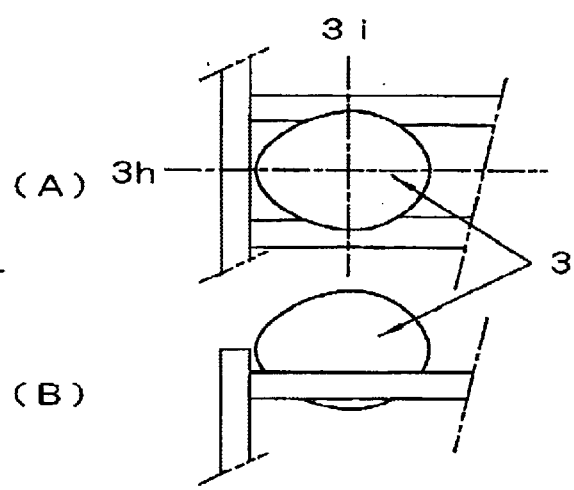

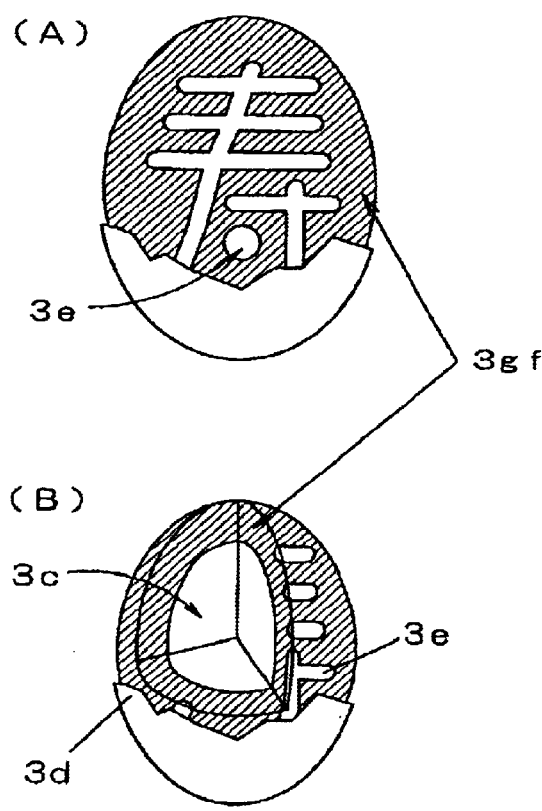
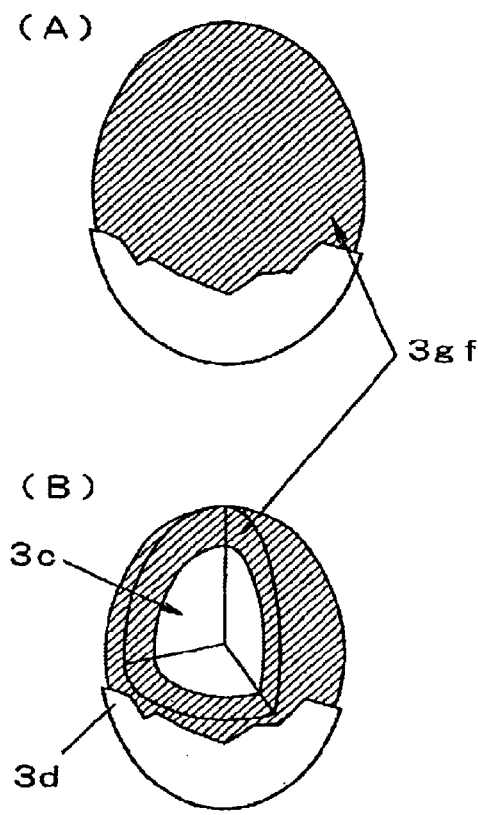

FIG. 18
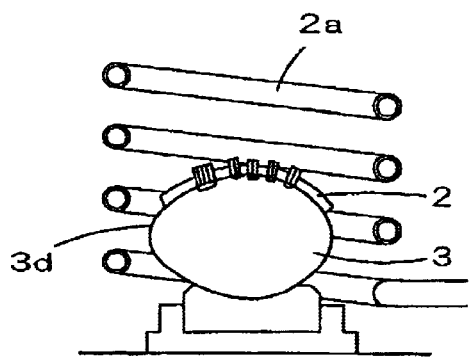
FIG. 19
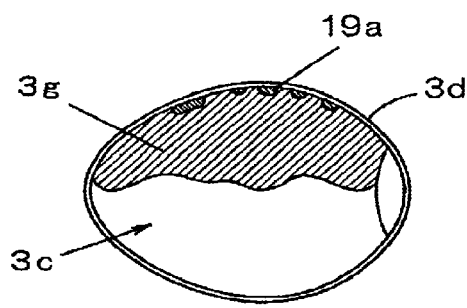
FIG. 20
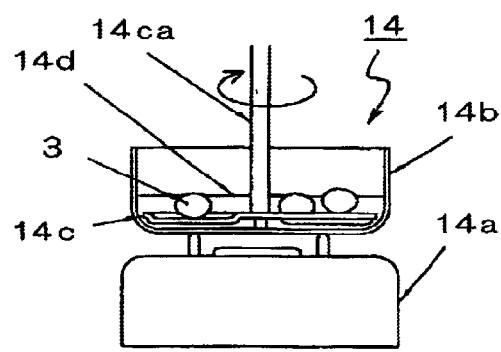
FIG. 21
(A)
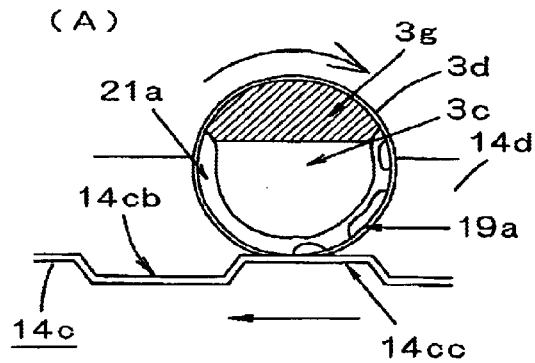
(B)
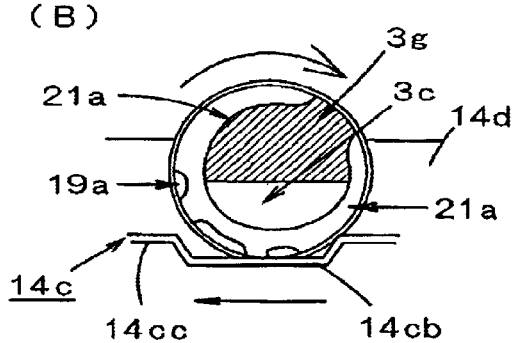
(C)
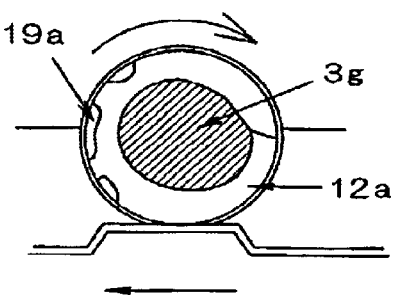

PATTERNED BOILED EGG AND PROCESS FOR PRODUCING THE SAME

TECHNICAL FIELD

The present invention relates to a boiled egg cooked by boiling an egg, such as an egg of a hen or duck, dipped wholly or partially in a beating medium, such as hot water, and a method for producing the boiled egg, more particularly to a boiled egg with a pattern, on its curved surface after removal of its eggshell, drawn by a yolk pattern layer coagulating in an egg white skin layer coagulating, so as to form the curved surface of the boiled egg after removal of the eggshell, or reversely, drawn by an egg white layer coagulating in a yolk skin layer, and a method for producing the boiled egg.

BACKGROUND ART

A boiled egg itself is a foodstuff habitually eaten from ancient times, and even during the present it is frequently eaten as it is; the way of cutting has been improved, and a boiled egg is used only for ornamentation on the dining table as a garnish and thus generally remains as a commonplace foodstuff. Aside from the drawing of patterns, characters and figures on the outer surface of the eggshell, in conventional attempts to draw patterns or the like on the curved surface of the boiled egg after removal of the eggshell, coloring matters are inserted under pressure or penetrated area-selectively in some form from the outside of the eggshell through the eggshell, and the coloring matters are impregnated on the curved surface of the boiled egg to draw patterns; hence, there are dangers that microorganisms may enter through minute damaged portions of the eggshell owing to the insertion under pressure and penetration treatment of the coloring matters, or that contaminants may enter because of the treatment itself; commercialization of such drawing is thus obstructed owing to concerns about food hygiene control.

As such a prior art, Japanese Unexamined Patent Publication No. Hei 2-249469 discloses a boiled egg, wherein numerous minute holes are provided by perforation on the surface of the eggshell, and desired patterns or characters are color-printed on the curved surface of the egg white, or seasonings are penetrated to provide a flavor, from the outside through the eggshell with the eggshell unremoved.

Furthermore, Japanese Unexamined Patent Publication No. Hei 2-27962 discloses a yolk/egg white reversed boiled egg having a reversed arrangement of the yolk and egg white in an eggshell without using any additives from the outside, wherein small holes are provided at both the acute end portion and the obtuse end portion of the egg, air is supplied under pressure from one small hole into the eggshell to discharge the egg white through the other small hole to the outside of the eggshell, and the yolk remaining inside the eggshell is heated together with the eggshell so that the yolk coagulates and is attached to the inner face of the eggshell to form an outside yolk layer; next, the discharged egg white is poured into the inside of the outside yolk layer through the one small hole, and the egg white is heated together with the eggshell so that the egg white coagulates at the central portion of the egg with the outside of the egg white surrounded by the yolk layer. An egg produced in this way also has a danger in food hygiene control.

Regarding food proceeding to be carried out for the egg white and yolk inside the eggshell without any concerns about entry of microorganisms through the minute damaged portions of the eggshell and entry of contaminants because of the coloring treatment itself in the prior art, Japanese Unexamined Patent Publication No. Hei 2-211850 discloses a method for stirring and mixing the yolk and egg white in an eggshell by tearing the yolk film by manually swinging an egg accommodated in a cylindrical egg container made of nylon. The egg processed and provided by this method is advantageous in food hygiene control since only the materials inside the eggshell are used; however, this egg is a strange "thick omelet-like" boiled egg covered with eggshell; although the advantage in food hygiene control is ensured, this egg is far inferior to a "thick omelet-like" fried egg in terms of seasoning, wherein the egg is commonplace as a cooked egg; in particular, the curved surface of the egg with the eggshell removed is monotonous, uniform and dull in color, whereby the egg does not provide an attractive tastefulness on the dining table.

As desired above, in the prior art, two trade-off requests, i.e., food hygiene control and tastefulness on the dining table, are not fulfilled adequately, thereby causing a problem of incomplete satisfaction in the ornamental expression on the curved surface of the boiled egg with the eggshell removed with respect to tastefulness on the dining table.

DISCLOSURE OF THE INVENTION

In view of the problem of satisfaction in tastefulness on the dining table in the above-mentioned prior art, the present invention is intended to provide ornamental patterns in two colors, white and yellow, by drawing a pattern by a yolk pattern layer formed area-selectively in an egg white skin layer on the curved surface of the boiled egg with its eggshell removed, and by drawing another pattern by an egg white pattern layer formed area-selectively in a yolk skin layer on the curved surface of the boiled egg, whereby the satisfaction of consumers with respect to tastefulness on the dining table is improved without introducing any materials inside the eggshell.

As a first aspect of the present invention for solving the above-mentioned problems, the invention set forth in claims 1 through 3 is claimed.

The configuration of the invention set forth in claim 1 relates to a structure of a patterned boiled egg, wherein, as shown in FIG. 9, a yolk skin layer 9a is formed of a yolk coagulating along nearly one half of the curved surface of the boiled egg, an egg white pattern layer 3e is formed of an egg white coagulating so as to draw a pattern against the background of the yolk skin layer 9a while eliminating the yolk near the curved surface inside the yolk skin layer 9a, and an egg white skin layer 9b is formed of the egg white coagulating along nearly the other half of the curved surface, other than the yolk skin layer 9a.

The configuration of the invention set forth in claims 2 and 3 relates to a method for producing the patterned boiled egg having the structure of the invention set forth in claim 1, comprising a first step, i.e., an egg white pattern layer forming step, for forming an egg white pattern layer so as to draw a pattern by heating a specific pattern area drawn on nearly one half of the curved surface of the eggshell of an egg area-selectively and concentrically, by coagulating an uncoagulated egg white on the inner face of the eggshell, and by removably attaching the uncoagulated egg white to the inner face of the eggshell; a second step, i.e., a rotating/stopping yolk film tearing step used as a yolk film tearing step, for tearing the yolk film, during the rotation of the egg around the major axis of the egg at a high speed of about 3,600 rpm, by immediately stopping the rotation and by applying a shearing force owing to the difference between the inertial force acting on the yolk at the central portion inside the eggshell and the inertial force acting on the egg white at the peripheral portion to the yolk film at the time of the immediate stop; a third step, i.e., a yolk positioning step, for positioning the uncoagulated yolk by floating the uncoagulated yolk after the tearing of the yolk film in the egg white inside the eggshell and by positioning the uncoagulated yolk so that the uncoagulated yolk surrounds the egg white pattern layer attached to the inner face of the eggshell and makes contact with the egg white pattern layer; a fourth step, i.e., a half yolk skin layer forming step, for forming a half yolk skin layer along nearly one half of the curved surface of the egg by boiling the egg, in which the uncoagulated yolk is positioned, in its stationary posture as it is in a heating medium, such as hot water, and by coagulating the uncoagulated yolk so that the uncoagulated yolk surrounds the egg white pattern layer, makes contact with the egg white pattern layer and becomes the background of the egg white pattern layer; and a simultaneously proceeding fifth step, i.e., a half egg white skin layer forming step, for forming a half egg white skin layer along nearly one half of the curved surface on the opposite side of the half yolk skin layer by boiling the egg, in which the uncoagulated yolk is positioned, in its stationary posture as it is in a heating medium, such as hot-water, and by coagulating the egg white sinking below the uncoagulated yolk floating in the eggshell.

In accordance with the configuration of the invention set forth in claims 1 through 3 claimed as the above-mentioned first aspect, the curved surface of the boiled egg with its eggshell removed is nearly halved; a pattern is clearly drawn in two colors in the yellow half yolk skin layer disposed on nearly one half by the white egg white pattern layer, and the white half egg white skin layer is disposed on nearly the other half other than the yellow half yolk skin layer; hence, the contrast of the halves of the curved surface is intensified in ornamental expression, thereby providing a tasteful boiled egg.

As a second aspect of the present invention for solving the above-mentioned problems, the invention set forth in claims 4 through 7 is claimed.

The configuration of the invention set forth in claim 4 relates to a structure of a patterned boiled egg, wherein, as shown in FIG. 16, a whole yolk skin layer $3gf$ is formed of a yolk coagulating along the whole curved surface of the boiled egg, an egg white pattern layer $3e$ is formed of an egg white coagulating so as to draw a pattern against the background of the whole yolk skin layer $3gf$ while eliminating the yolk near the curved surface inside the whole yolk skin layer $3gf$.

The configuration of the invention set forth in claim 5 relates to a method for producing the patterned boiled egg having the structure of the invention set forth in claim 4, comprising a first step, i.e., an egg white pattern layer forming step, for forming an egg white pattern layer similar to that set forth in claim 2; a second step, i.e., a yolk film tearing step for carrying out a film tearing step similar to the yolk film tearing step set forth in claim 2; a third step, i.e., a whole yolk skin layer forming step, for forming a whole yolk skin layer along the whole curved surface of the egg so that the whole yolk skin layer becomes the background of the egg white pattern layer by sequentially exposing the whole face of the curved surface of the egg to a heating environment while rotating the egg including the uncoagulated yolk after film tearing, by floating the yolk in the egg white inside the eggshell, by attaching the yolk to the eggshell and by sequentially coagulating the uncoagulated yolk surrounding the egg white pattern layer and making contact with the egg white pattern layer near the inner face of the eggshell at the portion exposed to the heating environment during rotation and rocking or immediately after rotation and rocking.

The configuration of the invention set forth in claim 6 relates to the execution of the whole yolk skin layer forming step in the method of producing the patterned boiled egg set forth in claim 5, comprising a first sub-step, i.e., a central portion yolk skin layer forming step, for forming a central portion yolk skin layer along the curved surface of a portion corresponding to the central portion along the major axis of the curved surface of the egg by sequentially exposing the portion corresponding to the central portion along the major axis of the curved surface of the egg to an upper heating environment while rotating the egg around the major axis of the egg used as its horizontal rotation center axis, and by sequentially coagulating the uncoagulated yolk floating in the egg white inside the eggshell and attached to the eggshell near the inner face of the upper portion of the eggshell exposed to the overheating environment during the rotation; a second sub-step, i.e., an acute end portion yolk skin layer forming step, for forming an acute end portion yolk skin layer along the curved surface of the acute end portion by exposing the acute end portion of the egg to the upper heating environment while rotating the egg around the major axis of the egg used as its inclined vertical rotation center axis, and by coagulating the uncoagulated yolk floating in the egg white inside the eggshell at the acute end portion and attached to the eggshell; and a third sub-step, i.e., an obtuse end portion yolk skin layer forming step, for forming an obtuse end portion yolk skin layer along the curved surface of the obtuse end portion by boiling the egg in a heating medium, such as hot water, in a stationary posture wherein the major axis of the egg extends vertically and the obtuse end portion is positioned upward, and by coagulating the uncoagulated yolk floating in the egg white inside the eggshell at the obtuse end portion and attached to the eggshell.

The configuration of the invention set forth in claim 7 relates to the execution of the whole yolk skin layer forming step in the method of producing the patterned boiled egg set forth in claim 5, comprising a first sub-step, i.e., a rotating/rocking whole yolk skin layer forming step, for forming a whole yolk skin layer along the whole curved surface of the egg, by boiling the egg while rotating the egg around the major axis of the egg mainly used as its rotation center axis and while rocking the egg around the minor axis of the egg mainly used as its rocking center axis in a state wherein the egg is wholly dipped in a heating medium, such as hot water, and by coagulating the uncoagulated yolk, which is relatively easy to coagulate, floating near the inner face of the upper portion of the eggshell and attached to the eggshell, earlier than the uncoagulated egg white, which is relatively difficult to coagulate, sinking near the inner face of the lower portion of the eggshell and attached to the eggshell, during the rotation and rocking.

In accordance with the configuration of the invention set forth in claims 4 through 7 claimed as the above-mentioned second aspect, a yellow whole yolk skin layer is formed so as to cover the whole of the curved surface of the boiled egg with its eggshell removed, and a pattern is drawn by the white egg white pattern layer against the background of the whole yolk skin layer; hence, the white pattern against the simple background of a single color, yellow, is expressed stably so as to appear clearly, thereby providing a tasteful boiled egg.

As a third aspect of the present invention for solving the above-mentioned problems, the invention set forth in claims 8 through 10 is claimed.

The configuration of the invention set forth in claim 8 relates to a structure of a patterned boiled egg, wherein, as shown in FIG. 22, a whole egg white skin layer 21a is formed of an egg white coagulating along the whole curved surface of the boiled egg, and a yolk pattern ,layer 19a is formed of a yolk coagulating so as to draw a pattern against the background of the whole egg white skin layer 21a while eliminating the egg white near the curved surface inside the whole egg white skin layer 21a.

The configuration of the invention set forth in claim 9 relates to a method for producing the patterned boiled egg having the structure of the invention set forth in claim 8, comprising a first step, i.e., a yolk film tearing step for tearing the yolk film of an egg; a second step, i.e., a yolk positioning step, for positioning an uncoagulated yolk after the tearing of the yolk film by floating the uncoagulated yolk in the egg white inside the eggshell and by positioning the uncoagulated yolk so that the uncoagulated yolk makes contact with the inner face of the eggshell; a third step, i.e., a yolk film layer forming step, for forming a yolk pattern layer, corresponding to the egg white pattern layer obtained by the egg white pattern layer forming step of claim 2, for the uncoagulated yolk, the film of which is torn; and a fourth step, i.e., a whole egg white skin layer forming step for forming a whole egg white skin layer along the whole curved surface of the egg by boiling the egg, in which the yolk pattern layer is formed, while rotating and rocking the egg around the major axis of the egg used as its rotating/rocking center axis in a state wherein the egg is partially dipped in a heating medium, such as hot water, and by coagulating the uncoagulated egg white, which is relatively difficult to coagulate, sinking near the inner face of the lower portion of the eggshell dipped in the heating medium and attached to the eggshell, earlier than the uncoagulated yolk, which is relatively easy to coagulate, floating near the inner face of the upper portion of the eggshell not dipped in the heating medium and attached to the eggshell, during the rotation and rocking, so that the uncoagulated egg white surrounds the yolk pattern layer attached to the inner face of the eggshell, makes contact with the yolk pattern layer and becomes the background of the yolk pattern layer.

The configuration of the invention set forth in claim 10 relates to the execution of the yolk film tearing step in the method of producing the patterned boiled egg set forth in claim 9 by using a rotating/stopping yolk film tearing step similar to that set forth in claim 3.

In accordance with the configuration of the invention set forth in claims 8 through 10 claimed as the above-mentioned third aspect, in comparison with the configuration of the invention set forth in claims 1 through 7 claimed as the first and second aspects the color arrangement relationship between the background and the pattern is reversed, that is, a pattern of the yellow yolk pattern layer is drawn against the background of the white whole egg white skin layer disposed to cover the whole of the curved surface, thereby providing unexpected enjoyment in the reverse expression of the color arrangement of the background and the pattern; in particular, tasteful boiled eggs are also provided in view of unexpected enjoyment from the combination of a pair of eggs identical in pattern but reverse in the color arrangement with respect to the background and the pattern, that is, an egg having the structure (FIG. 16) of the invention set forth in claim 4 as the second aspect and an egg having the structure (FIG. 22) of the invention set forth in claim 8 as this third aspect.

As a fourth aspect of the present invention for solving the above-mentioned problems, the invention set forth in claims 11 through 13 is claimed.

The configuration of the invention set forth in claim 11 relates to a structure of a patterned boiled egg, wherein, as shown in FIG. 26, a half egg white skin layer 9b is formed of an egg white coagulating along nearly one half of the curved surface of the boiled egg, a yolk pattern layer 19a is formed of a yolk coagulating so as to draw a pattern against the background of the half egg white skin layer 9b while eliminating the egg white near the curved surface inside the half egg white skin layer 9b, and a half yolk skin layer 9a is formed of a yolk coagulating along nearly the other half of the curved surface.

The configuration of the invention set forth in claims 12 and 13 relates to a method for producing the patterned boiled egg having the structure of the invention set forth in claim 11, comprising a first step, i.e., a rotating/stopping yolk film tearing step for tearing the yolk film, similar to that set forth in claims 2 and 3 and used as a yolk film tearing step; a second step, i.e., a yolk positioning step for floating the yolk in the egg white, similar to that set forth in claim 9 and used as a yolk positioning step; a third step, i.e., a yolk pattern layer forming step for forming a yolk pattern layer, similar to that set forth in claim 9 and used as a yolk pattern layer forming step; a fourth step, i.e., a yolk/egg white positioning step, for positioning an uncoagulated yolk by floating the uncoagulated yolk in the egg white inside the eggshell so that the uncoagulated yolk makes contact with nearly the other half of the inner face of the eggshell of the egg after the yolk pattern layer is formed and attached, and for positioning an uncoagulated egg white by sinking the unco-agulated egg white so that the uncoagulated egg white surrounds the yolk pattern layer attached to nearly one half of the inner face of the eggshell of the egg and makes contact therewith; a fifth step, i.e., a half egg white skin layer forming step, for forming a half egg white skin layer along nearly one half of the curved surface of the egg by boiling the egg, after the positioning of the yolk and egg white, in its stationary posture as it is in a heating medium, such as hot water, and by coagulating the uncoagulated egg white so that the uncoagulated egg white sinks below the uncoagulated yolk floating inside the eggshell, surrounds the yolk pattern layer, makes contact with the yolk pattern layer and becomes the background of the yolk pattern layer; and a sixth step, i.e., a half yolk skin layer forming step, for forming a half yolk skin layer along nearly the other half of the curved surface of the egg by boiling the egg, after the positioning of the yolk and egg white, in its stationary posture as it is in a heating medium, such as hot water, and by coagulating the uncoagulated yolk floating in the egg white inside the eggshell.

In accordance with the configuration of the invention set forth in claims 11 through 13 claimed as the above-mentioned fourth aspect, in comparison with the configuration of the invention set forth in claims 1 through 7 claimed as the first and second aspects, the color arrangement relationship between the background and the pattern is reversed, and the curved surface is divided into nearly equal halves; that is, in the white half egg white skin layer disposed on nearly one half, a pattern is drawn clearly by the yellow yolk pattern layer in two colors, and in nearly the other half other than the white half egg white skin layer, the yellow half yolk skin layer is disposed, thereby providing unexpected enjoyment in the reverse expression of the color arrangement of the background and the pattern; in particular, tasteful boiled eggs are also provided in view of unexpected enjoyment from the combination of a pair of eggs identical in pattern but reverse in the color arrangement of the background and the pattern, that is, an egg having the structure (FIG. 9) of the invention set forth in claim 1 as the first aspect and an egg (FIG. 26) having the structure of the invention set forth in claim 11 as this fourth aspect.

As a fifth aspect of the present invention for solving the above-mentioned problems, the invention set forth in claims 14 through 16 is claimed.

The configuration of the invention set forth in claim 14 relates to a structure of a patterned boiled egg, wherein, as shown in FIG. 30, a half egg white skin layer 9b is formed of an egg white coagulating along nearly one half of the curved surface of the boiled egg, a yolk pattern layer 19a is formed of a yolk coagulating so as to draw a pattern against the background of the half egg white skin layer 9b while eliminating the egg white near the curved surface inside the half egg white skin layer 9b, a half yolk skin layer 9a is formed of a yolk coagulating along nearly the other half of the curved surface of the boiled egg, and an egg white pattern layer 3e is formed of an egg white coagulating so as to draw a pattern against the background of the half yolk skin layer while eliminating the yolk near the curved surface inside the half yolk skin layer 9a.

The configuration of the invention set forth in claims 15 and 16 relates to a method for producing the patterned boiled egg having the structure of the invention set forth in claim 14, comprising a first step, i.e., a rotating/stopping yolk film tearing step, similar to that of the invention set forth in claims 12 and 13 and used as a yolk film tearing step; a second step, i.e., a yolk positioning step, similar to that of the invention set forth in claim 12; a third step, i.e., a yolk pattern layer forming step, similar to that of the invention set forth in claim 12; a fourth step, i.e., an egg white pattern layer forming step, carried out simultaneously with or before or after this, for forming an egg white pattern layer by heating a specific pattern area drawn on nearly the other half of the curved surface area-selectively and concentrically, and by coagulating the uncoagulated egg white on the inner face of the eggshell so that the uncoagulated egg white removably attaches to the inner face of the eggshell and draws a pattern; and a fifth step, i.e., a yolk/egg white positioning step; and a sixth step, i.e., a half egg white skin layer forming step and a seventh step, i.e., a half yolk skin layer forming step, similar to those of the invention set forth in claim 12, respectively; the production method is completed by these subsequent steps.

In accordance with the configuration of the invention set forth in claims 14 through 16 claimed as the above-mentioned fifth aspect, the curved surface is divided into nearly equal halves, and in the white half egg white skin layer disposed on nearly one half, a pattern is drawn clearly by the yellow yolk pattern layer in two colors, and in the half yellow yolk skin layer disposed in nearly the other half other than the white half egg white skin layer, another pattern is drawn clearly by the white egg white pattern layer in two colors, reversed in color arrangement with respect to the egg white pattern layer; hence, regarding the background and the pattern evaluated in accordance with the relationship between an egg (FIG. 26) of the invention set forth in claim 11 as the fourth aspect and an egg (FIG. 9) of the invention set forth in claim 1 as the first aspect, the unexpected enjoyment in the combination of patterns, identical in patterns but reverse in color arrangement, is united on the curved surface of one boiled egg, thereby providing a tasteful boiled egg.

Generally, the configuration of the invention set forth in all the claims as the above-mentioned first to fifth aspects provides an ornamental expression by forming patterns in two colors, white and yellow, on the curved surface of a boiled egg in a state with its eggshell removed, by using only the yolk and egg white, the original contents inside the eggshell, as materials and by only selectively applying heat and acceleration, without providing any mechanical process for the eggshell and without introducing any materials into the eggshell from outside the eggshell; hence, two trade-off requests, i.e., the removal of anxiety in food hygiene control and the improvement in tastefulness on the dining table, are fulfilled, whereby the satisfaction of consumers with respect to tastefulness on the dining table is improved.

BRIEF EXPLANATION OF DRAWINGS

FIG. 1 through FIG. 9 relate to the first aspect of the invention.

FIGS. 1(A) through (D) are explanatory views showing the configuration and production process of an induction heating pattern sheet for a yolk/egg white pattern layer forming step.

FIG. 2 relates to an induction heating apparatus for an egg white pattern layer forming step in accordance with the invention set forth in claim 2; FIG. 2(A) is a plan view of the main portion of the induction heating apparatus loaded with an egg to which the induction heating pattern sheet is attached, and FIG. 2(B) is a partially sectional side view of the main portion.

FIG. 3 is a sectional view of an egg to which the induction heating pattern sheet shown in FIG. 2 is attached.

FIG. 4 is an external perspective view showing the configuration of a yolk film tearing apparatus for a yolk film tearing step in accordance with the invention set forth in claims 2 and 3.

FIG. 5 is a sectional view of an egg after the yolk film tearing step.

FIG. 6 is a sectional view of an egg in a horizontal stationary posture.

FIG. 7 is a sectional view showing the configuration of a horizontal stationary egg boiling apparatus for a half yolk skin layer forming step and a half egg white skin layer forming step set forth in claim 2.

FIG. 8 shows the configuration of an egg holder in the stationary egg boiling apparatus of FIG. 6; FIG. 8(A) is an extracted plan view of the main portion thereof, and FIG. 8(B) is an extracted side view of the main portion thereof.

FIG. 9 shows the structure of a patterned boiled egg in accordance with the invention set forth in claim 1; FIG. 9(A) is a front view of the egg with its eggshell removed, FIG. 9(B) is a side view thereof, FIG. 9(C) is a perspective view of the egg with its eggshell partially removed, and FIG. 9(D) is a partially sectional perspective view thereof.

FIG. 10 through FIG. 17 relate to the second aspect of the invention.

FIG. 10 shows the configuration of a horizontal rotation heating apparatus for a central portion yolk skin layer forming step in accordance with the invention set forth in claim 6;

FIG. 10(A) is a front sectional view thereof, and FIG. 10(B) is a side sectional view thereof.

FIG. 11 shows the configuration of an inclined rotation heating apparatus for an acute end portion yolk skin layer forming step in accordance with the invention set forth in claim 6; FIG. 11(A) is a front view thereof, and FIG. 11(B) is a side sectional view thereof.

FIG. 12 is a front sectional view showing the configuration of a vertical stationary egg boiling apparatus for an obtuse end portion yolk skin layer forming step in accordance with the invention set forth in claim 6.

FIG. 13 is a sectional view of a boiled egg supported by an egg holder in the vertical stationary egg boiling apparatus of FIG. 12.

FIG. 14 shows the configuration of a whole dipping rotating/rocking egg boiling apparatus for a rotating/rocking whole yolk skin layer forming step in accordance with the invention set forth in claim 7; FIG. 14(A) is a plan view thereof, and FIG. 14(B) is a front sectional view thereof.

FIGS. 15(A), (B) and (C) are explanatory views for illustrating the operation of a whole yolk skin layer forming step in time series in the whole dipping rotating/rocking egg boiling apparatus of FIG. 14.

FIG. 16 shows the structure of a patterned boiled egg in accordance with the invention set forth in claim 4; FIG. 16(A) is a front view of the egg with its eggshell partially removed, and FIG. 16(B) is a partially sectional perspective view of the egg of FIG. 16(A).

FIG. 17 shows the structure of a modified example of the patterned boiled egg of FIG. 16.

FIG. 18 through FIG. 22 relate to the third aspect of the invention.

FIG. 18 is a side sectional view of the main portion of the induction heating apparatus loaded with an egg to which the induction heating pattern sheet for a yolk pattern layer forming step set forth in claim 9 is attached.

FIG. 19 is a sectional view showing the extracted configuration of an egg loaded in the induction heating apparatus of FIG. 18.

FIG. 20 is a front sectional view showing the configuration of a partial dipping rotating/rocking egg boiling apparatus for a whole egg white skin layer forming step in accordance with the invention set forth in claim 9.

FIGS. 21(A), (B) and (C) are explanatory views for illustrating the operation of the whole egg white skin layer forming step in time series in the partial dipping rotating/rocking egg boiling apparatus of FIG. 20.

FIG. 22 shows the structure of a patterned boiled egg in accordance with the invention set forth in claim 8; FIG. 22(A) is a front view of the egg with its eggshell partially removed, and FIG. 22(B) is a partially sectional perspective view of the egg of FIG. 22(A).

FIG. 23 is a side sectional view of the main portion of the induction heating apparatus loaded with an egg to which the induction heating pattern sheet for a yolk pattern layer forming step set forth in claim 12 is attached.

FIG. 24 is a sectional view showing the extracted configuration of an egg loaded in the induction heating apparatus of FIG. 23.

FIG. 25 is an extracted sectional view showing an egg in a yolk/egg white positioning step in accordance with the invention set forth in claim 12.

FIG. 26 is a side view showing the structure of a patterned boiled egg in accordance with the invention set forth in claim 11.

FIG. 27 is a side sectional view of the main portion of the induction heating apparatus loaded with an egg to which the induction heating pattern sheets for a yolk pattern layer forming step and an egg white pattern layer forming step set forth in claim 15 are attached.

FIG. 28 is a sectional view showing the extracted configuration of an egg loaded in the induction heating apparatus of FIG. 27.

FIG. 29 is an extracted sectional view showing an egg in a yolk/egg white positioning step in accordance with the invention set forth in claim 15.

FIG. 30 is a side view showing the structure of a patterned boiled egg in accordance with the invention set forth in claim 15.

FIG. 31 is a perspective view of an area-selective heating apparatus replaceable with the induction heating apparatus, and FIG. 32 is an explanatory view of a yolk film tearing apparatus.

BEST MODE FOR CARRYING OUT THE INVENTION

The best mode for embodying the invention set forth in claims 1 through 3 will be described below as the first aspect of the present invention referring to FIG. 1 through FIG. 9. Before an egg white pattern layer forming step for attaching an egg white pattern layer formed of an egg white coagulating on the curved surface of an egg or a yolk pattern layer forming step for attaching a yolk pattern layer formed of a coagulating yolk in a similar way to the inner face of the eggshell by area-selectively heating the eggshell externally, an induction heating pattern sheet required for area-selective heating on the surface of the eggshell by using an induction heating apparatus is produced. As shown in FIG. 1(A), a guide pattern $1b$ assumed to be a pattern in the end on the curved surface of a boiled egg is drawn on a base sheet $1a$ made of paper by an appropriate method such as printing. This kind of base sheet $1a$ is placed on an integrated magnetic block $1c$ having an identical magnetic pole configuration as shown in FIG. 1(B), and inducted particles $1d$ of a magnetic material are magnetized on the guide pattern guided by the guide pattern $1b$ on the sheet, thereby attracted and fixed; hence, a character "Kotobuki" is drawn by a collection of the inducted particles $1d$ in the case of the example shown in the figure. For example, segments obtained by cutting a mini-rope (trade name, made by Toyo Mini-Rope Co., Ltd.) commercially available as a 0.12 mm diameter steel wire rope comprising a bundle of 0.03 mm diameter element wires to a length of about 5 mm can be used properly as the inducted particles $1d$ of the magnetic material. Next, commercially available silicone rubber, for example, TSE3504 silicone rubber (made by Toshiba Silicone Co., Ltd.), is poured over the collection of the inducted particles $1d$ on the base sheet $1a$ within the range of the base sheet $1a$ in an open state; as shown in FIGS. 1(C) and 1(D), an induction heating pattern sheet 2 is formed on the guide sheet $1a$ to enclose the collection of the inducted particles id for drawing the guide pattern and to have a contour suited for attachment to the outer surface of the eggshell. The induction heating pattern sheet 2 formed in this way is removed from the guide sheet $1a$ and is attached to an appropriate position on the surface of the eggshell.

Figure 2:
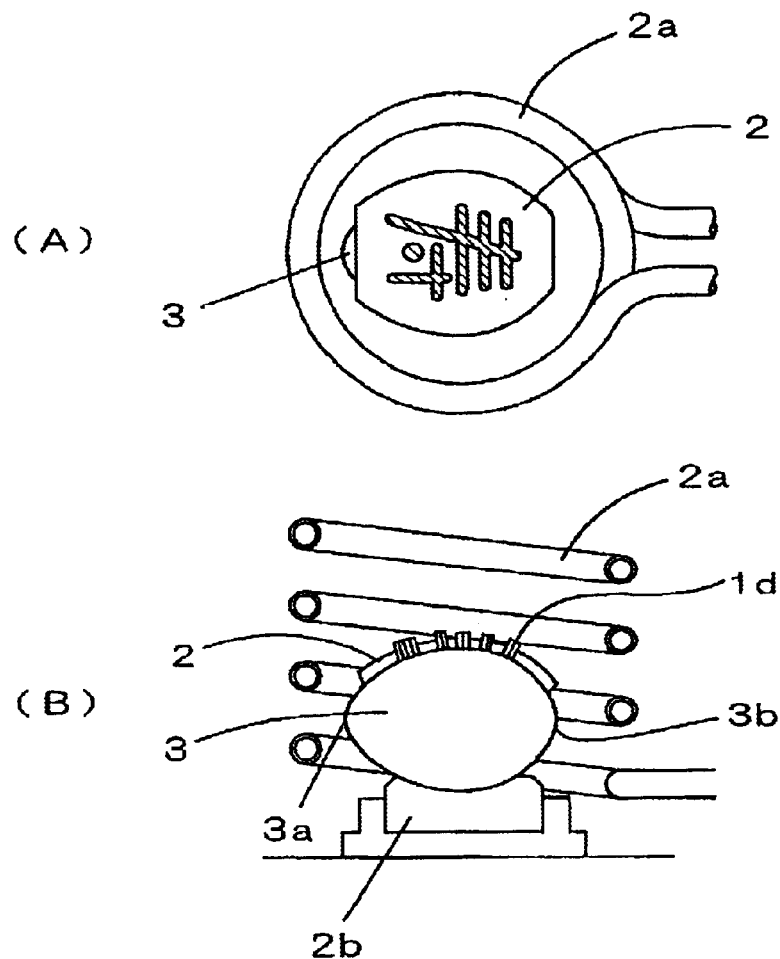
Figure 3:
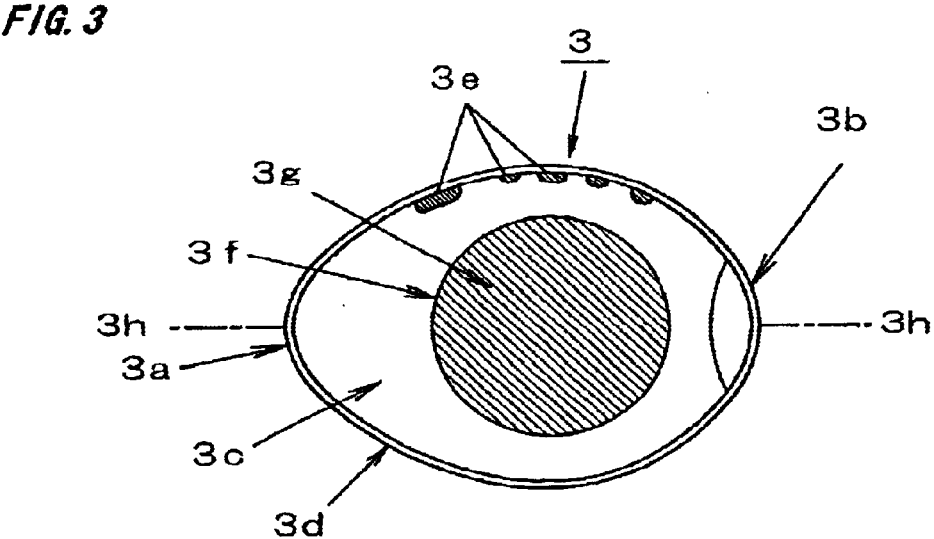

An egg 3, to which the induction heating pattern sheet 2 is attached, is loaded in a heating chamber surrounded by the induction coil $2a$ of an ordinary induction heating apparatus as shown in FIG. 2(A). As an induction heating apparatus for this purpose, for example, a commercially available induction heating furnace MU-1700B (made by Sekisui Electronics Co., Ltd.) can be used properly; in a typical case, induction heating is carried out at a setting temperature of 150° C. and for a duration of 10 to 20 seconds by this heating furnace (450 kHz, 350 W). In the case of the example shown in the figure, as shown in FIG. 2(B), the induction heating pattern sheet 2 is attached to the upper portion of the eggshell of the egg 3, which is mounted in a horizontal attitude on a heating mount base 2b made of a non-conductive material so that the acute end portion 3a is positioned on the left side and the obtuse end portion 3b is positioned on the right side in the figure. In this state, for example, when the egg white pattern layer forming step starts and when high-frequency electric power is supplied to the induction coil 2a of the induction heating apparatus, by inducted eddy current inducted in the collection of the inducted particles id inside the induction heating pattern sheet 2 attached to the surface of the eggshell of the egg 3, the collection is heated, and the surface temperature of the eggshell is maintained at about 150° C.; hence, the area on the outer surface of the eggshell of the egg 3, corresponding to the area of the pattern drawn by the collection, is heated area-selectively and concentrically. In the egg 3 heated area-selectively and concentrically, the egg white 3c positioned on the peripheral portion confronts the inner face of the eggshell 3d as shown in FIG. 3; by the area-selective and concentric heating via the eggshell 3d, an egg white pattern layer 3e having a thickness of about 1 mm is formed on the outer surface of the egg white, and the egg white pattern layer is removably attached to the corresponding inner face of the upper portion of the eggshell 3d. In this stage, an uncoagulated yolk 3g enclosed with a strong yolk film 3f is surrounded by the uncoagulated egg white 3c and floats at the center portion. The major axis 3h of the egg 3 is an axis of connection from the acute end portion 3a on the left side in the figure and the obtuse end portion 3b on the right side in the figure.

Figure 4:
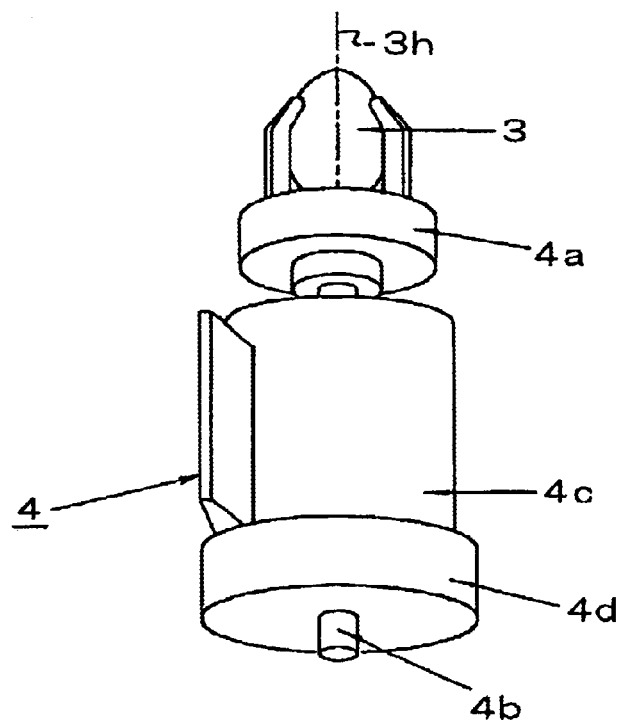
Figure 5:
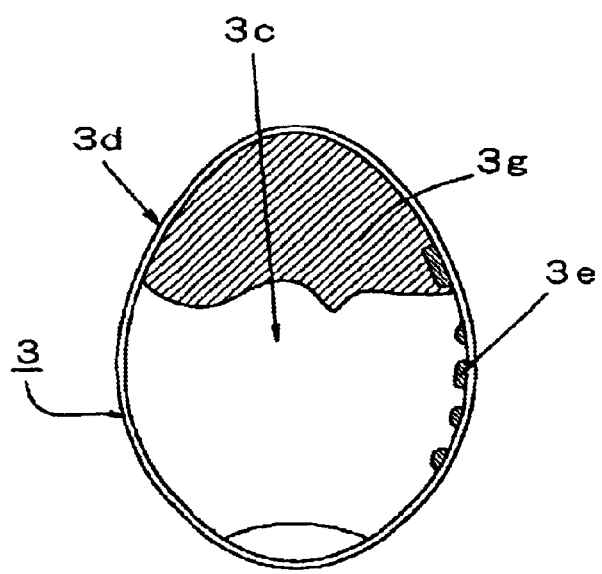
Figure 9:
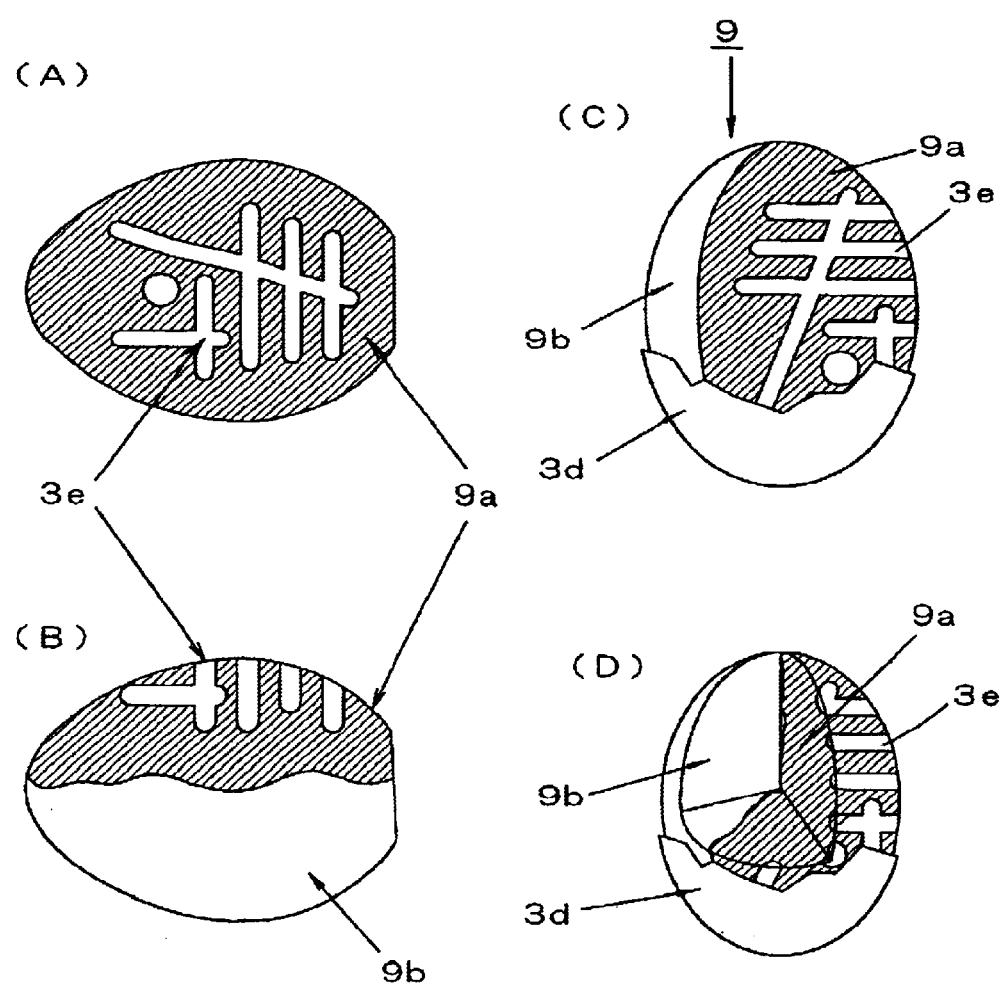

In the next yolk film tearing step, the egg 3 after the formation of the egg white pattern layer is held in a yolk film tearing apparatus 4 by an appropriate ordinary holding mechanism 4a as shown in FIG. 4. In the yolk film tearing apparatus 4, a motor 4c for rotating its rotation shaft 4b at high speed is integrally assembled with a brake 4d for immediately stopping the rotation shaft 4b during its rotation; the holding mechanism 4a is provided at one end of the rotation shaft 4b. The commercially available BNPCF-J-0.4 type Motor Unit (made by Hitachi Ltd.) is suitably usable as the integrated structure of the motor 4c and the brake 4d. The egg 3 held with the holding mechanism 4a is rotated for about 3 seconds at a rotation speed of about 3,6000 rpm around the major axis 3h used as its rotation center axis via the rotation shaft 4b rotated by the motor 4c, and during this rotation, the brake 4d is applied and the rotation is stopped immediately. At the time of the immediate stop at each of the several repetitions of this intermittent operation of high-speed rotation and immediate stop, a shearing force owing to the difference between the inertial force acting on the yolk 3g at the central portion in the eggshell 3d and the inertial force acting on the egg white 3c at the peripheral portion applies to the yolk film 3f, thereby tearing the yolk film. After the yolk film 3f is torn, since the specific gravity of the uncoagulated yolk 3g is relatively smaller than that of the egg white 3c, the uncoagulated yolk 3g floats in the uncoagulated egg white 3c and moves upward inside the eggshell 3d as shown in FIG. 5. In the following yolk positioning step, the egg 3 is positioned so that the uncoagulated yolk 3g floating in the egg white 3c inside the eggshell 3d makes contact with the egg white pattern layer 3e attached to the inner face of the eggshell 3d; in the example shown in FIG. 6, the egg 3 is positioned in a horizontal stationary posture so that the major axis 3h of the egg 3 becomes nearly horizontal and so that the egg white pattern layer 3e is located upward. As a result, as shown in FIG. 6, the uncoagulated yolk 3g floating in the uncoagulated egg white 3c makes contact with the egg white pattern layer 3e attached to the inner face of the upper portion of the eggshell 3d.

In the following half yolk skin layer forming step and the following half egg white skin layer forming step, as shown in FIG. 7, the eggs 3 positioned in the horizontal stationary posture are boiled in hot water used as a heating medium by a stationary egg boiling apparatus 7. The stationary egg boiling apparatus 7 shown in FIG. 7 is provided with a boiling bath 7b assembled on an ordinary heater 7a, such as a gas burner, and an egg holder 7c is installed inside the boiling bath 7b; the eggs 3 arranged in several rows and several columns are held by the egg holder 7c in the horizontal stationary posture as shown in FIG. 6, and dipped in the hot water 7d inside the boiling bath 7b and accommodated therein. In this case, the egg holder 7c may have a structure shown in FIGS. 8(A) and 8(B), wherein the lower portion of the egg 3 is fitted between a pair of beams 7e and 7e disposed orthogonally to the major axis 3h of the egg 3 and horizontally with a clearance slightly smaller than the length of the minor axis 3i of the egg 3, for measuring the maximum dimension between two confronting eggshells 3d and 3d, in the horizontal stationary posture so that the major axis 3h is in parallel with the longitudinal direction of the beams.

When the half yolk skin layer forming step and the half egg white skin layer forming step start, the heater 7a operates and continuously heats the hot water 7d inside the boiling bath 7b; the eggs 3 positioned and dipped in the horizontal stationary posture therein are usually boiled at about 80° C. for about 15 minutes. By this boiling, the uncoagulated yolk 3g floating in the egg white 3c inside the eggshell 3d surrounds the egg white pattern layer 3e and makes contact with the egg white pattern layer and then coagulates so as to become the background of the egg white pattern layer; hence, as shown in FIGS. 9(A) and 9(B), a half yolk skin layer 9a is formed along nearly one half of the curved surface of the egg; on the other hand, the egg white 3c sinking below the uncoagulated yolk 3g floating inside the eggshell 3d coagulates, whereby a half egg white skin layer 9b is formed along nearly the other half of the curved surface of the egg.

FIG. 9(C) is a perspective view showing the structure of a patterned boiled egg produced by the above serial production steps, with the eggshell 3d partially removed, and FIG. 9(D) is a similar partially sectional perspective view of this. In these figures, the half yolk skin layer 9a is formed by the yolk 3g coagulating along at least nearly one half of the curved surface of the boiled egg 9, thereby having a sufficient depth toward the central portion; the egg white pattern layer 3e is formed by the egg white 3c coagulating so as to draw a pattern against the background of the half yolk skin layer 9a while eliminating the yolk 9a near the curved surface inside the half yolk skin layer 9a, thereby having a slight depth toward the central portion; the half egg white skin layer 9b is formed by the egg white 3c coagulating along at least nearly the other half of the curved surface of the boiled egg 9, thereby having a sufficient depth toward the central portion. Next, the best mode for embodying the present invention set forth in claims 4 through 7 will be described below as the second aspect of the present invention referring to FIG. 10 through FIG. 17. An egg white pattern layer forming step to be carried out first is the same as the egg white pattern layer forming step described referring to FIG. 1 through FIG. 3 as the best mode for carrying out the first aspect of the invention, and the following yolk film tearing step is also the same as the yolk film tearing step described referring to FIG. 4 and FIG. 5.

Figure 12:
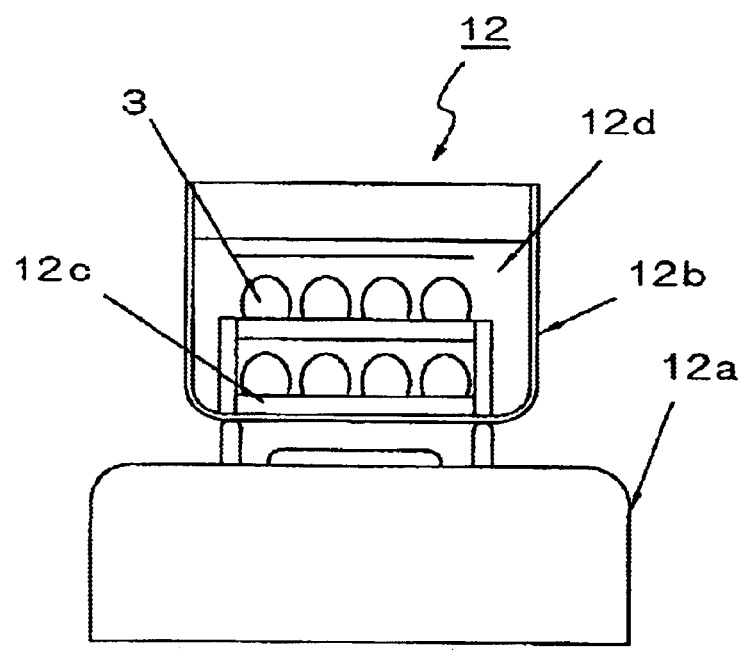
Figure 13:
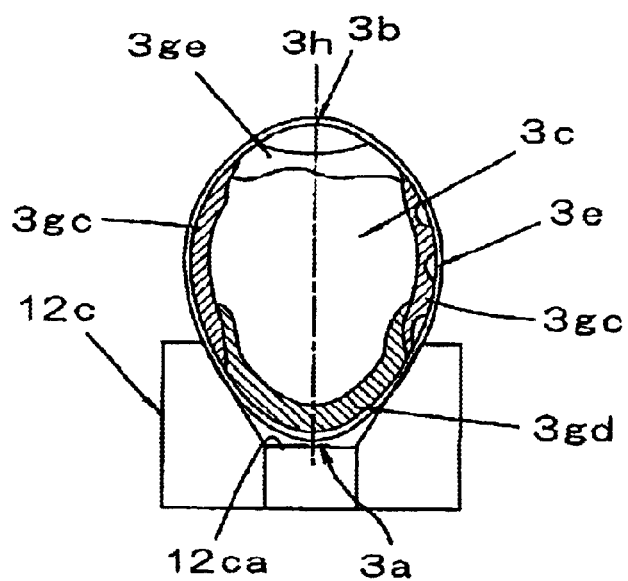
Figure 14:
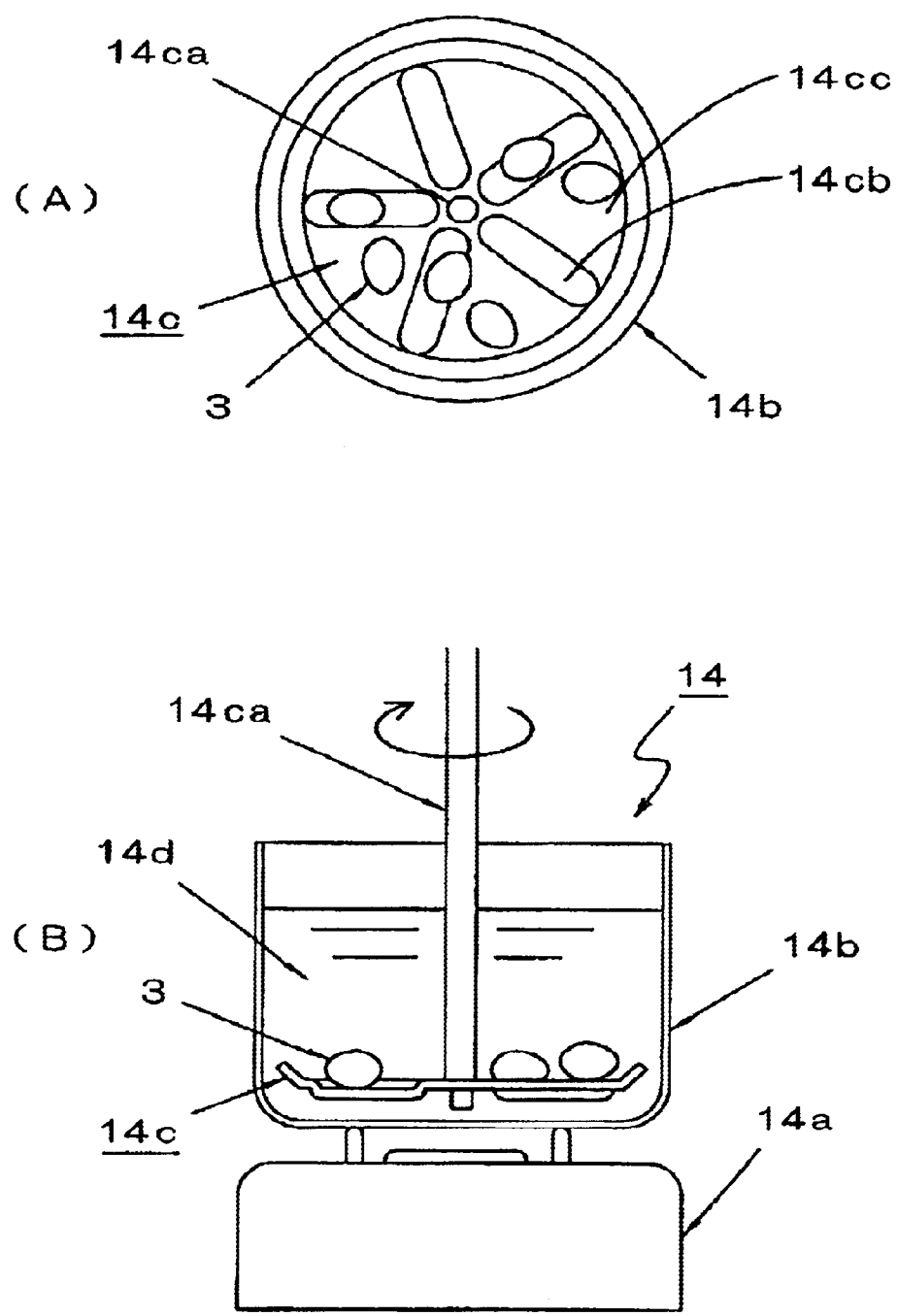
Figure 15:
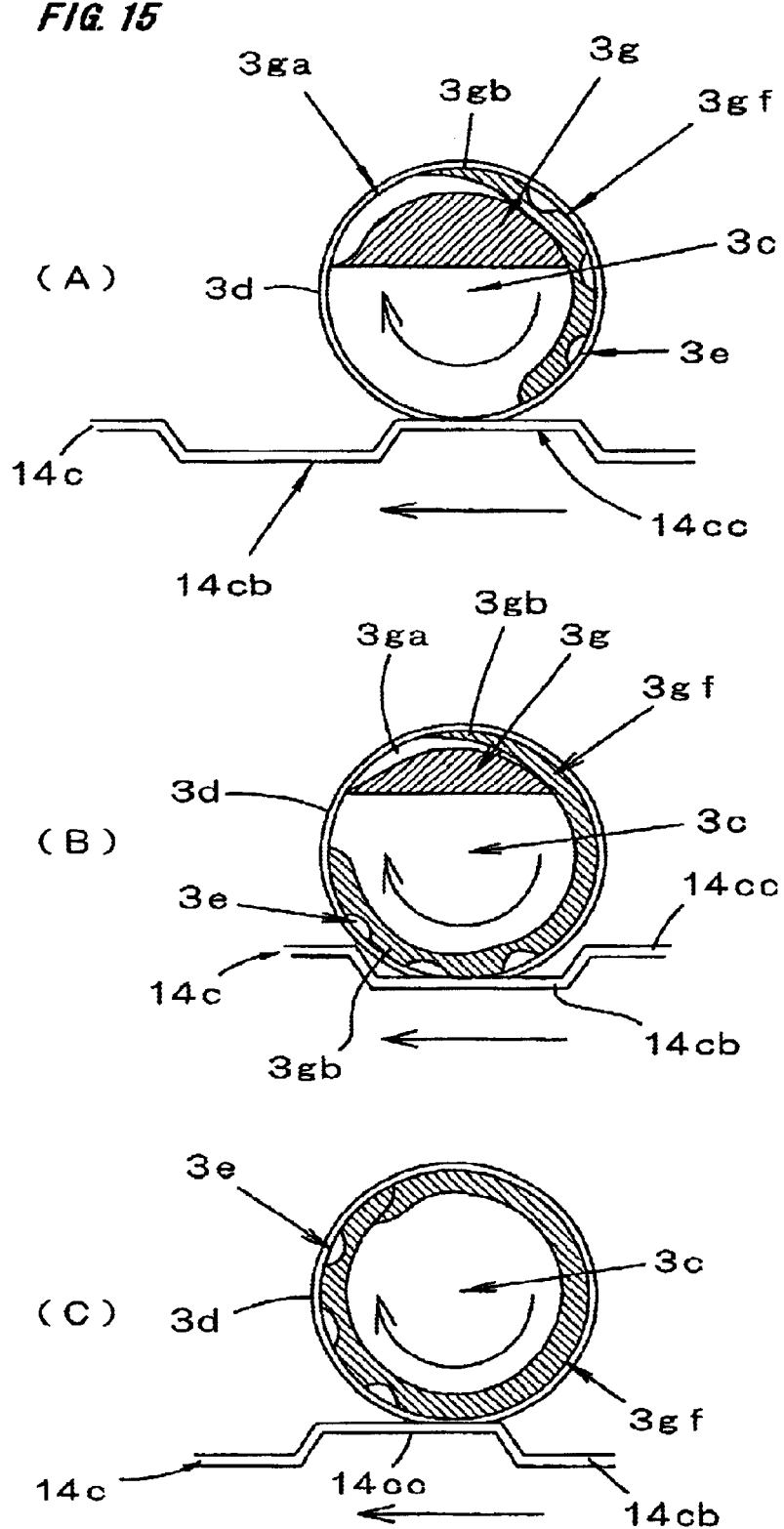
Figure 22:
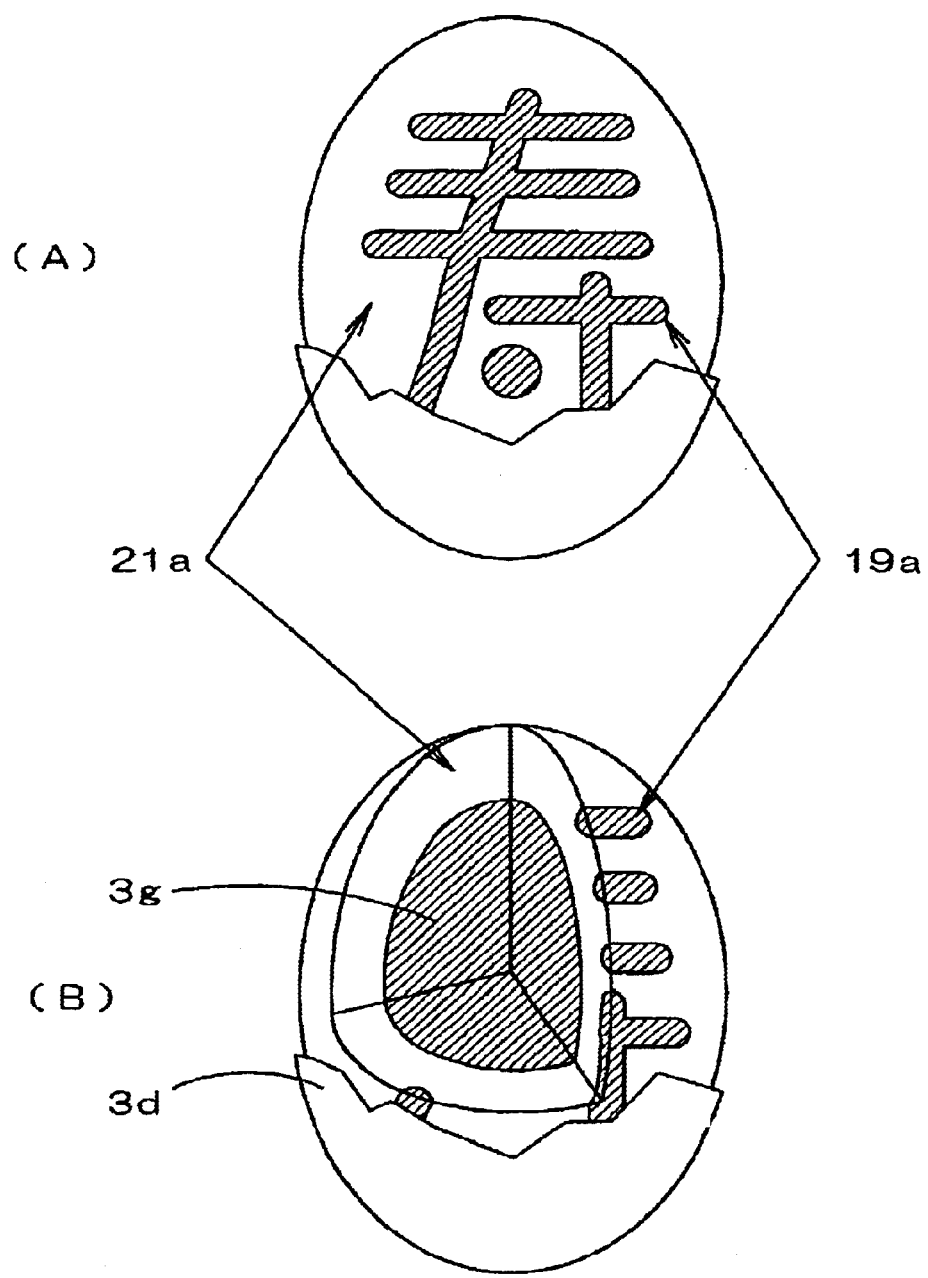

As the following whole yolk skin layer forming step, two examples, that is, a first embodiment described referring to FIG. 10 through FIG. 13 and a second embodiment described referring to FIG. 14 and FIG. 15, are proposed herein.

Figure 10:
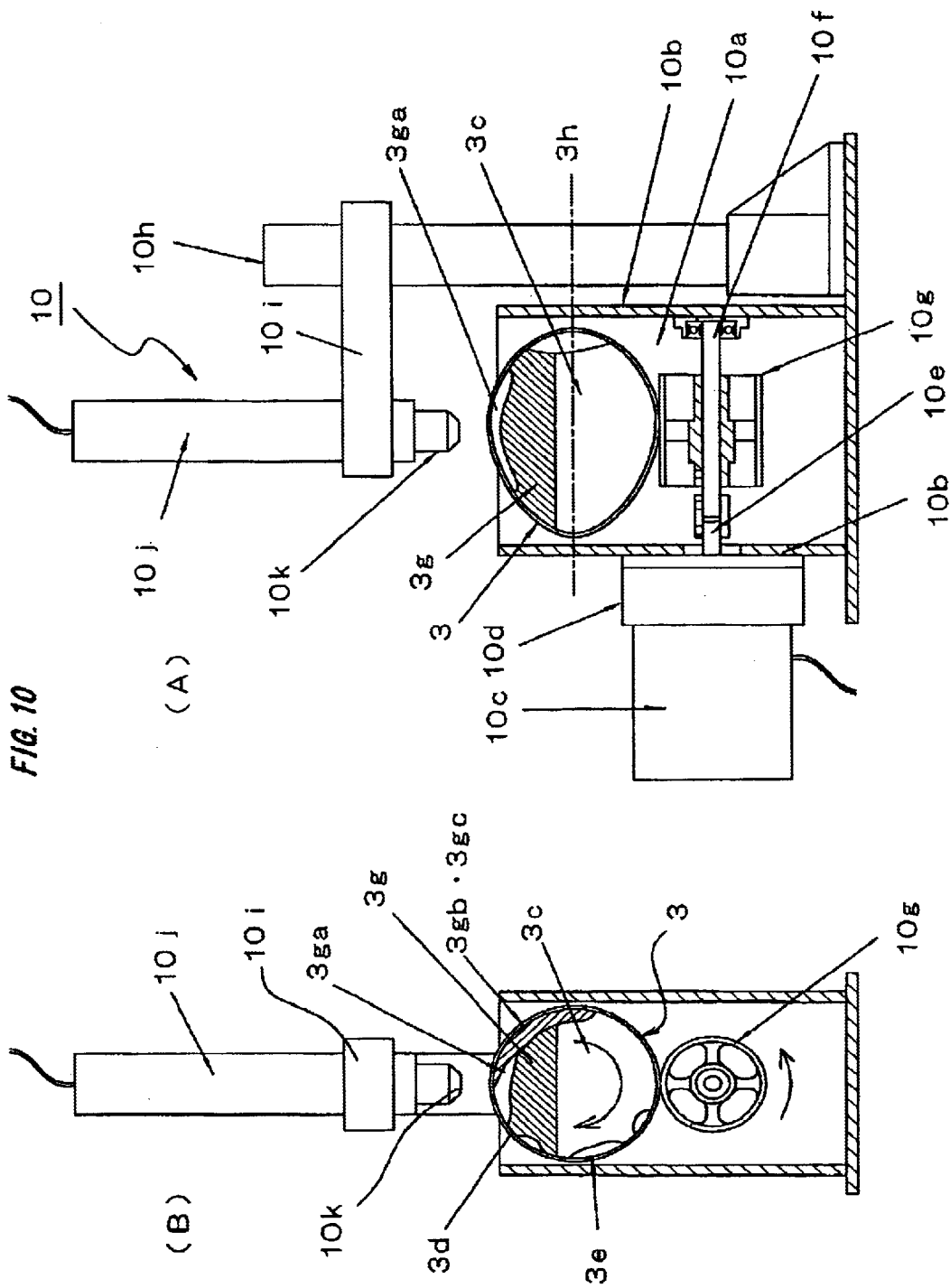

In the first embodiment, first, a central portion yolk skin layer forming step is carried out; in this step, as shown in FIG. 10, the egg 3 after the formation of the egg white pattern layer is loaded in a horizontal rotation heating apparatus 10. In the horizontal rotation heating apparatus 10, a motor 10c is installed on a frame 10b for partitioning a heating chamber 10a; an output rotation shaft 10e extending outside the motor 10c via an appropriate reduction gear 10d from the motor 10c is installed horizontally between a pair of opposed frames 10b and 10b; the tip of the output rotation shaft 10e; is rotatably supported by a bearing 10f on the opposed frame 10b; a cylindrical roller log is fitted on the output rotation shaft; in the heating chamber 10a above the cylindrical roller, the egg 3 is placed on the cylindrical roller 10g in a horizontal rotation attitude so that the major axis 3h is in parallel with the output rotation shaft 10e, whereby the egg 3 is loaded inside the heating chamber 10a. Near the frame 10b, a column 10h is disposed vertically, and a heating blower 10j is supported by a support arm 10i extending above the heating chamber 10a from the column, and the nozzle 10k of the heating blower 10j faces the upper portion of the egg 3 loaded inside the heating chamber 10a. When the central portion yolk skin layer forming step starts, the heating blower 10j operates to blow hot air of about 150° C. from the nozzle 10k to the upper portion of the egg 3; at the same time, the motor 10d also operates to rotate the cylindrical roller 10g via the rotation of the output rotation shaft 10f at a low speed counterclockwise as shown in FIG. 10(B). Then, the outer circumference of the egg 3 placed on the outer circumference of the rotating cylindrical roller 10g in a horizontal rotation attitude so as to make frictional contact with the outer circumference of the cylindrical roller 10g is fed by a friction force, and the egg 3 is rotated around the major axis 3h used as its horizontal rotation center axis at a low speed of one rotation in 4 minutes clockwise as shown in the figure. In the egg 3 rotating horizontally at a low speed clockwise as shown in FIG. 10(B) as described above, the uncoagulated yolk 3g, the film of which is torn, floats in the uncoagulated egg white 3c sinking downward, and gathers directly below the upper portion of the eggshell 3d; in the uncoagulated yolk 3g gathering here, the portion of the uncoagulated yolk 3g near the inner face of the eggshell 3d, exposed to the hot air blown from the heating blower 10j via the nozzle 10k, starts coagulating, and a coagulation start area 3ga is formed there and gradually changes to a completely coagulated area 3gb with the passage of time of the exposure to the hot air, and the coagulated area itself advances gradually clockwise as shown in FIG. 10(B) with the passage of time. As the number of the horizontal rotations of the egg 3 increases, the coagulation of the uncoagulated yolk 3g along the curved surface at the portion near the central portion of the curved surface of the egg 3 along the major axis 3h advances, whereby a central portion yolk skin layer 3gc is formed soon.

In the case when the egg white pattern layer 3e formed by the preceding egg white pattern layer forming step is attached to the inner face of the eggshell 3d in the area wherein the central portion yolk skin layer 3gc is formed, the central portion yolk skin layer 3gc is formed so as to surround the egg white pattern layer 3e and make contact with the egg white pattern layer, thereby becoming the background of the egg white pattern layer.

Figure 11:
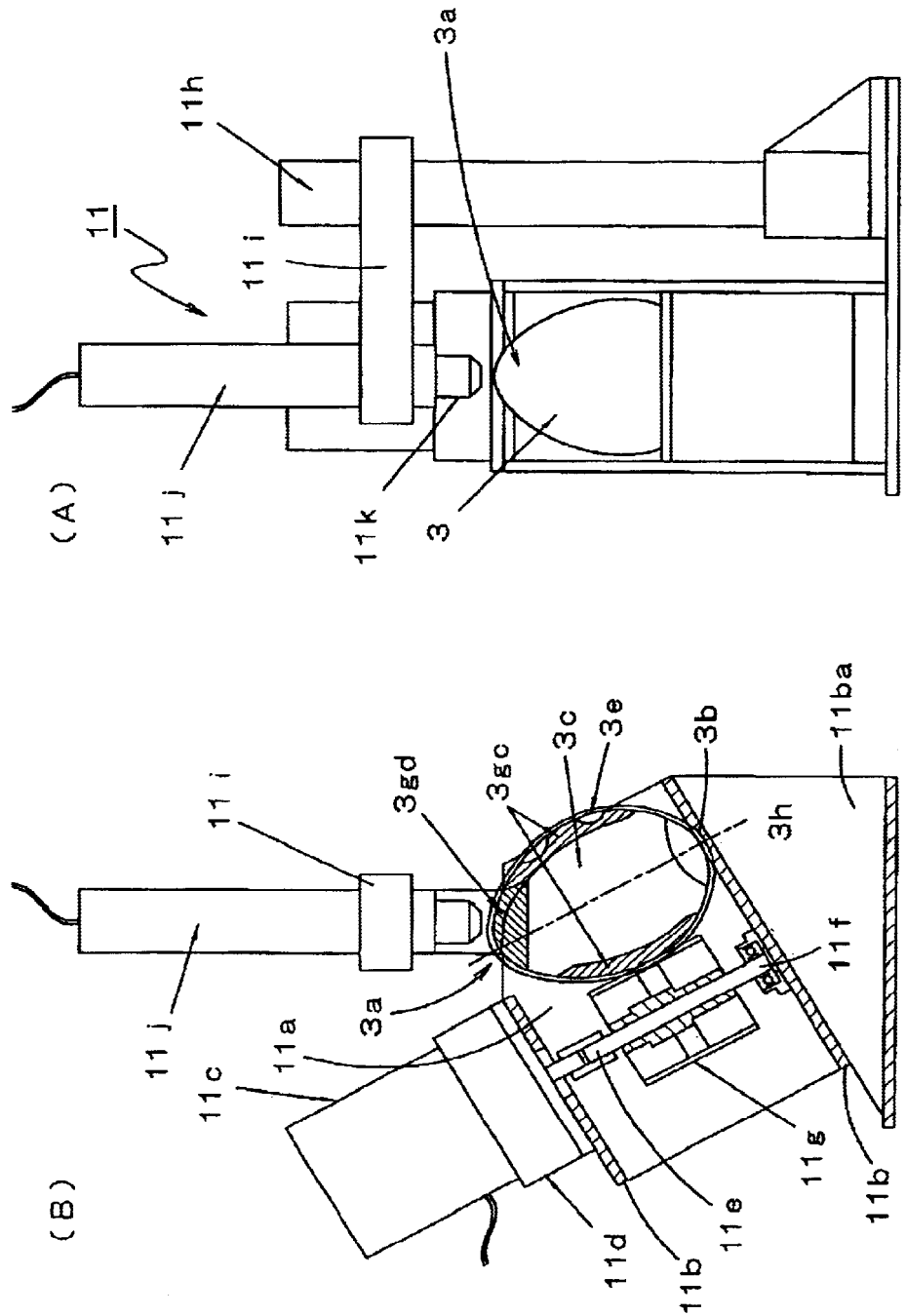

Next, in an acute end portion yolk skin layer forming step, the egg 3 subjected to the above-mentioned central portion yolk skin layer forming step is loaded in an inclined rotation heating apparatus 11 shown in FIG. 11. In the inclined rotation heating apparatus 11, an inclined frame 11b for partitioning an inclined heating chamber 11a is installed on an inclined base 11ba; a bearing 11f is securely installed on the inclined frame 11b secured to the installation face of the inclined base 11ba; a motor 11c is installed on the opposed upper inclined frame 11b; an output rotation shaft 11e extending outside the motor 11c via an appropriate reduction gear 11d from the motor 11c is installed horizontally between a pair of inclined frames 11b and 11b; an inclined cylindrical roller 11g is fitted on the output rotation shaft; in the inclined heating chamber 11a disposed at the upper right of the inclined cylindrical roller in the figure, the egg 3 is loaded in the inclined heating chamber 11a by placing the egg on the inclined cylindrical roller 11g in an inclined rotation attitude so that the major axis 3h is in parallel with the output rotation shaft 11e; in this case, the egg is loaded in an inclined attitude wherein the acute end portion 3a of the egg 3 faces the upper left in the figure and the obtuse end portion 3b is supported by the inclined face of the inclined base 11ba. The configuration wherein the nozzle 11k of a heating blower 11j supported by a column 11b and a support arm 11i faces the egg 3 is the same as that shown in FIG. 10; however, in this case, hot air from the nozzle 11k disposed at a predetermined inclined angle with respect to the major axis 3h of the egg 3 is blown to the acute end portion 3a of the egg 3. When the acute end portion yolk skin layer forming step starts, the acute end portion 3a of the egg 3 is rotated in an inclined state at low speed in a heating environment by hot air of about 150° C., just as in the case shown in FIG. 10. Then, the uncoagulated yolk 3g floating directly below the eggshell 3d at the acute end portion 3a of the egg 3 forms a coagulating area, and the coagulating area expands as the number of inclined rotations increases; an acute end portion yolk skin layer 3gd is soon formed so as to connect the formed central portion yolk skin layer 3gc with the acute end portion 3a of the egg 3.

In the following obtuse end portion yolk skin layer forming step, the egg 3 subjected to the above-mentioned acute end portion yolk skin layer forming step is loaded in a vertical stationary egg boiling apparatus 12 shown in FIG. 12. The vertical stationary egg boiling apparatus 12 is the same as the horizontal stationary egg boiling apparatus 7 shown in FIG. 7 in the basic configuration and provided with a heater 12a, a boiling bath 12b and an egg holder 12c; the eggs 3 are accommodated in the boiling bath 12b so as to be dipped in hot water 12d continuously heated by the heater 12a. In the case of the horizontal stationary egg boiling apparatus 7 shown in FIG. 7, the eggs 3 are maintained in a horizontal stationary posture by the holder 7c so that the major axes 3h of the eggs 3 are horizontal; however, in the case of the vertical stationary egg boiling apparatus 12 shown in FIG. 12, the eggs 3 are maintained in a vertical stationary posture by the holder 12c so that the major axes 3h of the eggs 3 are vertical and so that the obtuse end portions 3b of the eggs 3 face upward.

For this purpose, as shown in FIG. 13, the acute end portion 3a of the egg 3 is fitted in a concave portion 12ca generally formed to have a conical shape at the bottom portion of the holder 12c for the egg 3. When the obtuse end portion yolk skin layer forming step starts, the egg 3 is boiled, just as in the apparatus shown in FIG. 7. Hence, as shown in FIG. 13, the uncoagulated yolk 3c floating in the uncoagulated egg white 3c and gathering near the obtuse end portion 3b of the egg 3 in the above-mentioned vertical stationary posture coagulates, whereby an obtuse end portion yolk skin layer 3ge is formed so as to be connected to the formed central portion yolk skin layer 3gc at the obtuse end portion 3b at the upper position of the egg 3. This completes the first embodiment of the whole yolk skin layer forming step.

Next, in the second embodiment of the whole yolk skin layer forming step, a complete dipping rotating/rocking egg boiling apparatus 14 shown in FIG. 14 is the same as the apparatus shown in FIG. 7 in the basic configuration, except that a rotating/rocking disc for rotating the eggs 3 immediately after the eggs 3 are subjected to the yolk film tearing step is included instead of the holder for the eggs 3; the apparatus is provided with a heater 14a, a boiling bath 14b and a rotating/rocking disc 14c; the eggs 3 are accommodated in the boiling bath 14b so as to be wholly dipped in hot water 14d heated continuously by the heater 14a. However, in the apparatus shown in FIG. 14, rotation operation and rocking operation are provided for the eggs 3 in the hot water 14 inside the boiling bath 14b.

For this purpose, the rotating/rocking disc 14c having a disc-like shape is installed on the reduction output rotation shaft 14ca of an appropriate rotation drive apparatus, such as a motor, not shown, in an attitude so as to cover the circular bottom face of the boiling bath 14b as shown in FIG. 14(A). The rotating/rocking disc 14c is provided with belt-like concave step portions 14cb radially extending from the center of the reduction output rotation shaft 14ca, the width of which is close to the dimension of the minor axis of the egg 3; at the remaining portion of the rotating/rocking disc 14c, bulging step portions 14cc, projecting with respect to the concave step portions 14cb, are formed; hence, the concave step portions 14cb and the bulging step portions 14cc are arranged so as to be disposed alternately along the circumferential direction of the rotating/rocking disc 14c. In the rotating/rocking whole yolk skin layer forming step, in a state of being dipped completely in the hot water 14d maintained at about 70° C. inside the boiling bath 14b, the eggs 3 are rocked and rolled on the rotating/rocking disc 14c rotating at a low speed of about 10 rpm, whereby the eggs 3 are boiled for about 15 minutes while being subjected to rotation mainly around the major axis 3h of the egg 3 used as its rotation center axis and to rocking mainly around the minor axis 3i of the egg 3 used as its rocking center axis. FIG. 15 is a schematic explanatory view illustrating a time-series progress of actions to the egg 3 in the whole yolk skin layer forming step. In the first stage shown in FIG. 15(A), the uncoagulated yolk 3g floating in the egg white 3c inside the eggshell 3d and gathering at the upper portion owing to its low specific gravity in comparison with the egg white tends to coagulate easily at a low temperature in comparison with the egg white 3c and is sufficiently heated by the hot water 14d in a completely dipped state, whereby the coagulation start area 3ga of the yolk 3g is formed at the upper portion in an early stage, and the area 3ga is attached to the upper portion of the eggshell 3d. As the egg 3 having the coagulation start area 3ga of the yolk at the upper portion is moved to the middle left of FIG. 15(A) by the rotation of the rotating/rocking disc 14c itself, the egg 3 is rocked in the hot water, shoved so as to rise to the bulging step portion 14cc and rolls clockwise in the figure, thereby causing rotation reacted by the movement of the rotating/rocking disc 14c; hence, the coagulation start area 3ga of the yolk is rotated clockwise in the figure and moved, thereby gradually changing to the completely coagulated area 3gb. At that time, in an area wherein the yolk 3g changes to the completely coagulated area 3gb to become the whole yolk skin layer 3gf, in the case when the egg white pattern layer 3e formed by the preceding egg white pattern layer forming step has been attached to the inner face of the eggshell 3d, the whole yolk skin layer 3gf is formed so as to surround the egg white pattern layer 3e, make contact with the egg white pattern layer and become the background of the egg white pattern layer. When the rotation of the rotating/rocking disc 14c proceeds further, the egg 3 is rocked and shoved so as to fall from the bulging step portion 14cc to the concave step portion 14cb as shown in FIG. 15(B), thereby causing rotation owing to reaction in the clockwise direction in the figure; hence, the completely coagulated area 3gb turns and enters the lower portion; by this amount, the uncoagulated yolk 3g newly makes contact with the inner face of the upper portion of the eggshell 3d, thereby newly forming the coagulation start area 3ga. When the rotation of the rotating/rocking disc 14c proceeds further, the egg 3, while being rocked again, ejected from the concave step portion 14cb and shoved so as to rise to the bulging step portion 14cc, further continues clockwise rotation owing to reaction as shown in FIG. 15 C; hence, the tip portion of the completely coagulated area 3gb formed at the first stage shown in FIG. 15(A) in the rotation direction of the egg 3 is connected to the completely coagulated area 3gb formed at the latest stage; hence, the whole yolk skin layer is formed, and the uncoagulated egg white 3e that is difficult to coagulate at low temperature in comparison with the yolk 3g is surrounded at the central portion. After waiting for the coagulation of the egg white 3e at the central portion, proceeding with a delay, the whole yolk skin layer forming step is completed.

FIG. 16(A) is a front view showing the structure of a patterned boiled egg produced by the serial production steps including those in accordance with the first and second embodiments for forming the above-mentioned whole yolk skin layer forming structure, in a state with the eggshell partially removed; FIG. 16(B) is a partially sectional perspective view thereof. In the figures, the whole yolk skin layer 3gf is formed by the yolk 3g coagulating along the whole curved surface of the boiled egg and has a sufficient depth toward the central portion; the egg white pattern layer 3e is formed by the egg white 3c coagulating so as to draw a pattern against the background of the whole yolk skin layer 3gf by eliminating the yolk near the curved surface of the whole yolk skin layer 3gf, and has a slight depth toward the central portion. FIGS. 17(A) and (B), corresponding to FIGS. 16(A) and (B) with respect to drawing methods, show the structure of a boiled egg having only the whole yolk skin layer 3gf but not having the egg white pattern layer 3e. The boiled egg having this structure can be produced eventually by carrying out a process in which only the egg white pattern forming step, i.e., the first step, is eliminated from the serial production steps in accordance with the invention set forth in claim 5; this boiled egg should be referred to as an "unpatterned reversed boiled egg."

Next, the best mode for embodying the invention set forth in claims 8 through 10 will be described below as the third aspect of the present invention referring to FIG. 18 through FIG.22. In the third aspect of the present invention, a yolk film tearing step is carried out as the first production step, and this step itself is the same as that described referring to FIG. 4 and FIG. 5 with respect to the first aspect. In the following yolk positioning step, the induction heating pattern sheet 2 is attached to a desired position on the outer surface of the eggshell 3d of the egg 3 in preparation for the yolk pattern layer forming step, i.e., the next step; at that time, the egg 3 is positioned in an attitude wherein the eggshell 3d to which the induction heating pattern sheet 2 is attached becomes the upper face, and loaded in a heating chamber surrounded by the induction coil 2a of an induction heating apparatus; whereby, as shown in FIG. 19, the uncoagulated yolk 3g after the yolk film tearing step floats in the uncoagulated egg white 3c inside the eggshell 3d and makes contact with the inner face of the eggshell 3d. As shown in FIG. 18, the yolk pattern forming step, i.e., the next step, is carried out for the egg 3 in the heating chamber surrounded by the induction coil 2a; however, the heating itself at this step is the same as that of the egg white pattern forming step described with respect to the first aspect of the present invention referring to FIG. 1 through FIG. 3, but is characterized in that the positional relationship between the egg white and yolk is reversed vertically by the preceding yolk positioning step. As a result of this yolk pattern layer forming step, as shown in FIG. 19, the yolk pattern layer 19a formed by the coagulation of the uncoagulated yolk 3d is removably attached to the inner face of the upper portion of the eggshell 3d. In the following whole egg white skin layer forming step, the egg 3 is loaded in a partial dipping rotating/rocking egg boiling apparatus 14; the rotating/rocking egg boiling apparatus 14 itself used at this step is the same as that described with respect to the first aspect of the present invention referring to FIG. 14. However, in this step, unlike the state shown in FIG. 14, the egg 3 is not wholly dipped in hot water 14d, but the egg 3 is partially dipped in the hot water 14d as shown in FIG. 20, and boiling is carried out in this state; preferably, the boiling is carried out for about 15 minutes on the rotating/rocking disc 14c rotating at a low speed of about 0.5 rpm in a state wherein about a 60% portion in the minor axis dimension of the egg 3 is dipped in the hot water 14d maintained at about 90° C.

FIG. 21 is a schematic explanatory view illustrating a time-series progress of actions to the egg 3 in the whole egg white skin layer forming step. In the first stage shown in FIG. 21(A), the uncoagulated yolk 3g floating in the egg white 3c and gathering at the upper portion is exposed outside the surface of the hot water 14d and remains in an uncoagulated state because of insufficient heat reception from the hot water 14d; on the other hand, the uncoagulated egg white 3c, which tends to be coagulated with difficulty by heating in comparison with the yolk 3d, sinks downward in the eggshell 3d and sufficiently receives heat from around the hot water 14d in which the uncoagulated egg white is dipped; hence, the peripheral portion of the sunk uncoagulated egg white 3c gradually changes to the coagulated area 21a of the egg white 3c as the process proceeds, thereby growing to the whole egg white skin layer 21a soon. In the above-mentioned process of the growing of the whole egg white skin layer 21a, in the case when the yolk pattern layer 19a formed by the preceding yolk pattern layer forming step is attached to the inner face of the eggshell 3d in the area beyond that, the whole egg white skin layer 21a is formed so as to become the background of the yolk pattern layer 19a. When the rotation of the rotating/rocking disc 14c proceeds further, as shown in FIG. 21(B), the egg 3 is rocked and shoved so as to fall from the bulging step portion 14cc to the concave step portion 14cb, and the egg 3 rolls clockwise in the figure by reaction from the leftward movement of the rotating/rocking disc 14c; hence, the coagulated area 21a of the egg white 3c formed earlier is exposed outside the hot water 14d; by that amount, the coagulated area 21a of the egg white 3c is newly formed near the inner face of the eggshell 3d that has become dipped newly in the hot water 14d. When the rotation of the rotating/rocking disc 14c proceeds further, as shown in FIG. 21(C), the coagulated area 21a of the egg white 3c formed in the first stage shown in FIG. 21(A) is connected to the coagulated area 21a of the egg white 3c formed most recent, and the thickness of the area 21a increases; hence, the whole egg white skin layer 21a is formed, and the yolk 3g that is easy to coagulate at low temperature in comparison with the egg white 3c is surrounded thereby at the central portion while remaining uncoagulated. After waiting for the coagulation of the yolk, proceeding with a delay, the whole egg white skin layer forming step is completed.

FIG. 22(A) is a front view showing the structure of a patterned boiled egg produced by the serial production steps described above, in a state with the eggshell partially removed; FIG. 22(B) is a partially sectional perspective view thereof. In the figures, the whole egg white skin layer 21a is formed by the egg white 3c coagulated along the whole curved surface of the boiled egg and has a sufficient depth toward the central portion; the yolk pattern layer 19a is formed by the yolk 3g coagulating so as to draw a pattern against the background of the whole egg white skin layer 21a by eliminating the egg white near the curved surface of the whole egg white skin layer 21a, and has a slight depth toward the central portion.

Figure 23:
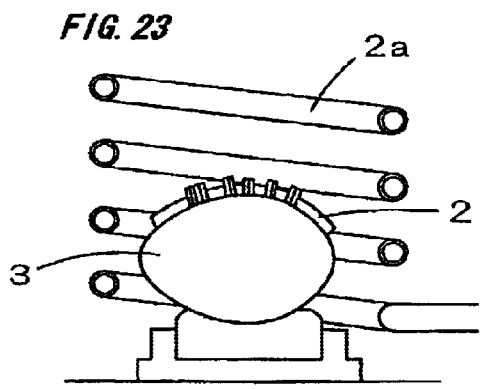
FIG. 23 through FIG. 26 relate to the fourth aspect of the invention.
Figure 24:
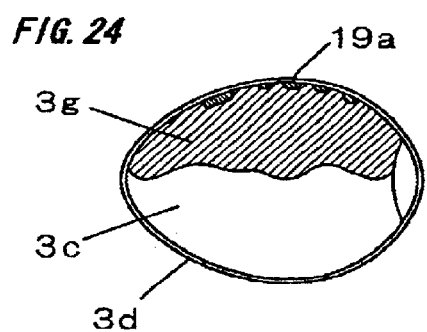

Next, the best mode for embodying the present invention set forth in claims 11 through 13 will be described below as the fourth aspect of the present invention referring to FIG. 23 through FIG. 26. The yolk film tearing step carried out first is the same as that described with respect to the first aspect of the present invention referring to FIG. 4 and FIG. 5. In the following yolk positioning step, the egg 3 positioned in an attitude shown in FIG. 23 is loaded in the heating chamber surrounded by the induction coil 2a; at that time, the yolk in the eggshell 3d floats and makes contact with the inner face of the eggshell 3d as shown in FIG. 24, and the following yolk pattern layer forming step is carried out at this stage; these yolk positioning step and yolk pattern layer forming step are the same as those described with respect to the third aspect of the present invention referring to FIG. 18 and FIG. 19. In the following yolk/egg white positioning step, the egg 3 having the attitude shown in FIG. 24 is positioned in the vertically reversed attitude shown in FIG. 25; hence, the uncoagulated yolk 3g floats in the egg white 3c, and in contrast therewith, the uncoagulated egg white 3c sinking downward makes contact with the yolk pattern layer 19a that is formed by the preceding yolk pattern layer forming step, positioned downward in this stage and attached to the inner face of the eggshell 3d. The following half egg white skin layer forming step and the half yolk skin layer forming step being carried out simultaneously therewith are the same as those described with respect to the first aspect of the present invention referring to FIG. 6 and FIG. 7; hence, a half egg white skin layer 9b is formed along nearly one half of the curved surface of the boiled egg, and a half yolk skin layer 9a is formed along nearly the other half of the curved surface.

Figure 26:
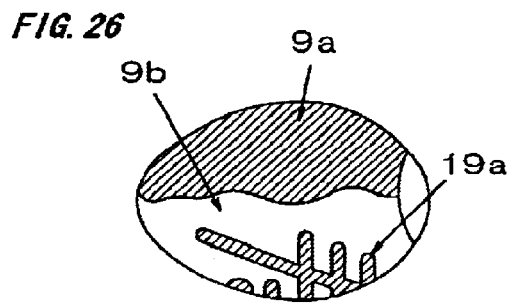

FIG. 26 is a side view showing the structure of a patterned boiled egg produced by the serial production steps described above, in a state with the eggshell 3d removed. In the figure, the half skin layer 9b is formed by the egg white 3c coagulating along nearly one half of the curved surface of the boiled egg and has a sufficient depth toward the central portion; the yolk pattern layer 19a is formed by the yolk 3g coagulating so as to draw a pattern against the background of the half egg white skin layer 9b by eliminating the egg white near the curved surface of the half egg white skin layer 9b and has a slight depth toward the central portion; the half yolk skin layer 9a is formed by the yolk 3g coagulating along nearly the other half of the curved surface of the boiled egg and has a sufficient depth toward the central portion.

Figure 27:
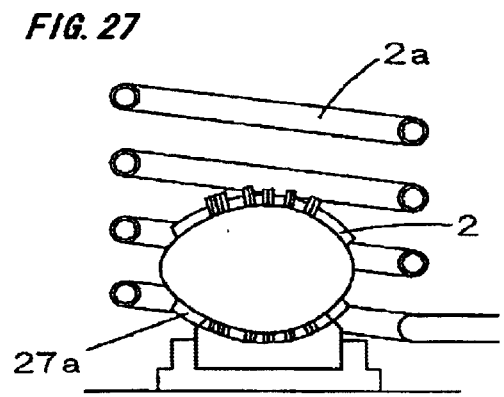
FIG. 27 through FIG. 30 relate to the fifth aspect of the invention.
Figure 28:
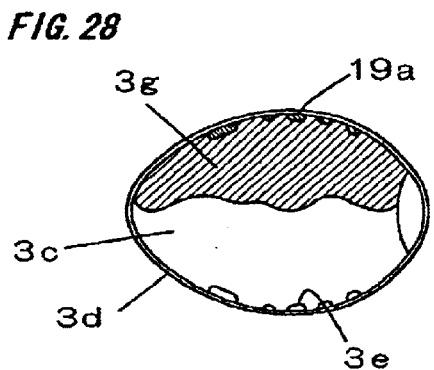

Next, the best mode for embodying the invention set forth in claims 14 through 16 will be described below as the fourth aspect of the present invention referring to FIG. 27 through FIG. 30. The yolk film tearing step carried out first is the same as those carried out in the first to fourth aspects; the following yolk positioning step is the same as that described with respect to the fourth aspect of the present invention referring to FIG. 24. However, the yolk pattern layer forming step is characterized in that this step is carried out together with the egg white pattern layer forming step simultaneously or sequentially. In order to form both the pattern layers, as shown in FIG. 27, in the attitude positioned by the yolk positioning step, the egg 3, provided with the induction heating pattern sheet 2 for forming a yolk pattern layer positioned above and attached to the surface of the eggshell 3d and an induction heating pattern sheet 27a for forming an egg white pattern layer positioned below and attached to the surface of the eggshell 3d, is loaded in the heating chamber inside the induction coil 2a. By area-selective induction heating for the egg 3, as shown in FIG. 28, the yolk pattern layer 19a is formed and attached to the inner face of the upper portion of the eggshell 3d, and at the same time, the egg white pattern layer 3e is formed and attached to the inner face of the lower portion of the eggshell 3d. In this explanation, the two induction heating pattern sheets 2 and 27a are attached simultaneously, whereby the yolk pattern layer 19a and the egg white pattern layer 3e are formed simultaneously; however, the steps for forming both the pattern layers may be independent from each other so as not to be limited in step conditions by attaching the two induction heating pattern sheets 2 and 27a at times different from each other and by carrying out the induction heating treatment at times different from each other.

Figure 25:
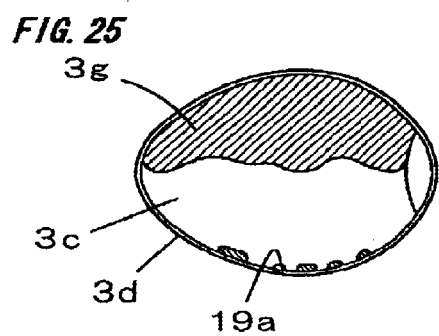
Figure 29:
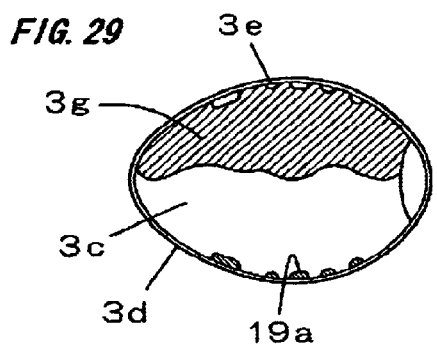

The following yolk/egg white positioning step is a step of vertically reversing the attitude of the egg 3 as shown in FIG. 29 and is the same as that described with respect to the fourth aspect of the present invention referring to FIG. 25. The following half egg white skin layer forming step and the half yolk skin layer forming step to be carried out simultaneously therewith are the same as those described with respect to the first aspect of the present invention referring to FIG. 6 and FIG. 7.

Figure 30:
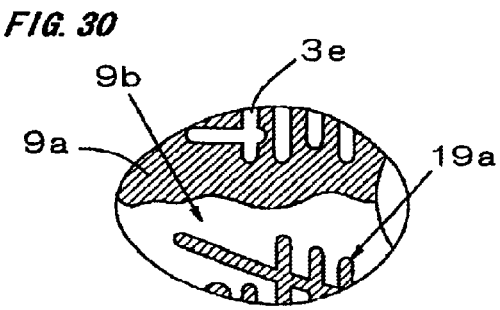

FIG. 30 is a side view showing the structure of a patterned boiled egg produced by the serial production steps described above, in a state with the eggshell 3d removed. In the figure, the half egg white skin layer 9b is formed by the egg white 3c coagulating along nearly one half of the curved surface of the boiled egg and has a sufficient depth toward the central portion; the yolk pattern layer 19a is formed by the yolk 3g coagulating so as to draw a pattern against the background of the half egg white skin layer 9b by eliminating the egg white near the curved surface of the half egg white skin layer 9b and has a slight depth toward the central portion; the half yolk skin layer 9a is formed by the yolk 3g coagulating along nearly the other half of the curved surface of the boiled egg and has a sufficient depth toward the central portion; the egg white pattern layer 3e is formed by the egg white 3e coagulating so as to draw a pattern against the background of the half yolk skin layer 9a and has a slight depth toward the central portion.

Figure 31:
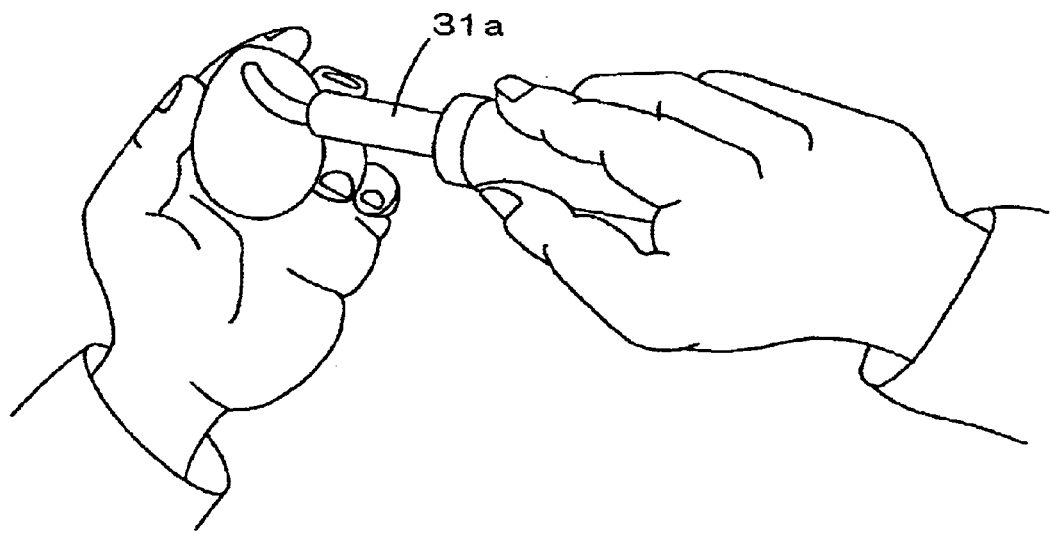
FIG. 31 and FIG. 32 relate to the prior art.
Figure 32:
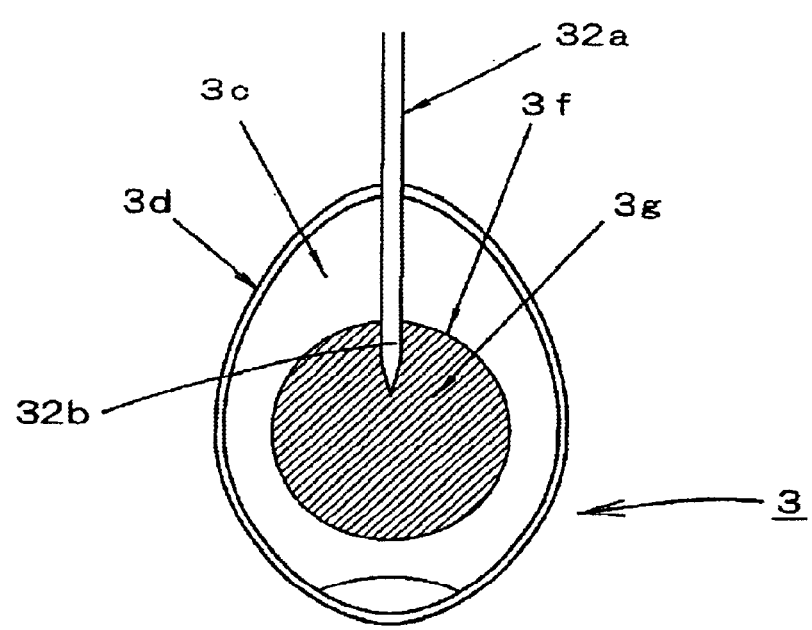

Each step itself of the serial production steps in the above-mentioned explanations can be replaced with another known step. For example, the egg white pattern layer forming step itself or the yolk pattern layer forming step itself may be a step wherein a pattern is drawn on the uncoagulated egg white or the uncoagulated yolk inside the eggshell by heating the surface of the eggshell area-selectively and concentrically through the manual operation of an electric iron 31a shown in FIG. 31. Furthermore, for example, as shown in FIG. 32, the yolk film tearing step may be a step of tearing the film by manually operating a thin needle 32a made of steel so that the tip 32b of the thin needle having passed through part of the eggshell 3d further passes through the yolk film 3f.

INDUSTRIAL APPLICABILITY

As described above, the present invention provides an ornamental expression by forming patterns in two colors, white and yellow, on the curved surface of a boiled egg in a state with its eggshell removed, by using the yolk and egg white, the original contents inside the eggshell, as materials and by only selectively applying heat and acceleration, without providing any mechanical process for the eggshell and without introducing any materials into the eggshell from outside the eggshell. Hence, two trade-off requests, i.e., the removal of anxiety in food hygiene control and the improvement in tastefulness on the dining table, are fulfilled, whereby consumers can have satisfaction with respect to tastefulness on the dining table, whereby the industrial applicability of the present invention is very high.

I claim:

1. A patterned boiled egg comprising:
    a half yolk skin layer formed of a yolk coagulating along nearly one half of the curved surface of said boiled egg;
    an egg white pattern layer formed of an egg white coagulating so as to draw a pattern against the background of said half yolk skin layer while eliminating the yolk near the curved surface inside said half yolk skin layer of said boiled egg; and
    a half egg white skin layer formed of the egg white coagulating along nearly the other half of the curved surface of said boiled egg.

2. A method for producing a patterned boiled egg including a series of production steps comprising:
    an egg white pattern layer forming step for forming an egg white pattern layer so as to draw a pattern by heating a specific pattern area drawn on nearly one half of the curved surface of the eggshell of an egg area-selectively and concentrically, by coagulating an uncoagulated egg white on the inner face of said eggshell, and by removably attaching said egg white to the inner face of said eggshell;
    a yolk film tearing step for tearing the yolk film of said egg after said egg white pattern layer forming step;
    a yolk positioning step for positioning an uncoagulated yolk after said yolk film tearing step by floating said uncoagulated yolk in the egg white inside said eggshell and by positioning said yolk so that said uncoagulated yolk surrounds said egg white pattern layer attached to the inner face of said eggshell and makes contact with said egg white pattern layer;
    a half yolk skin layer forming step for forming a half yolk skin layer along nearly one half of said curved surface of said egg by boiling said egg after said yolk positioning step in its stationary posture as it is in a heating medium, such as hot water, and by coagulating said uncoagulated yolk floating in said egg white inside said eggshell so that said uncoagulated yolk surrounds said egg white pattern layer, makes contact with said egg white pattern layer and becomes the background of said egg white pattern layer; and a half egg white skin layer forming step, proceeding simultaneously with said half yolk skin layer step, for forming a half egg white skin layer along nearly the other half of said curved surface of said egg by boiling said egg after said yolk positioning step in its stationary posture as it is in a heating medium, such as hot water, and by coagulating said egg white sinking below said uncoagulated yolk floating inside said eggshell.

3. A method for producing a patterned boiled egg set forth in claim 2, wherein said yolk film tearing step is a rotating/stopping yolk film tearing step for tearing said yolk film, during the rotation of said egg around the major axis of said egg at a high speed, by immediately stopping said rotation and by applying a shearing force owing to the difference between the inertial force acting on the yolk at the central portion inside said eggshell and the inertial force acting on the egg white at the peripheral portion to said yolk film at the time of said immediate stop.

4. A patterned boiled egg comprising:

a whole yolk skin layer formed of a yolk coagulating along the whole curved surface of said boiled egg; and an egg white pattern layer formed of an egg white coagulating so as to draw a pattern against the background of said whole yolk skin layer while eliminating the yolk near said curved surface inside said whole yolk skin layer of said boiled egg.

5. A method for producing a patterned boiled egg including a series of production steps comprising:

an egg white pattern layer forming step for forming an egg white pattern layer so as to draw a pattern by heating a specific pattern area drawn on nearly one half of the curved surface of the eggshell of an egg area-selectively and concentrically, by coagulating an uncoagulated egg white on the inner face of said eggshell, and by removably attaching said egg white to the inner face of said eggshell;

a yolk film tearing step for tearing the yolk film of said egg after said egg white pattern layer forming step; and a whole yolk skin layer forming step for forming a whole yolk skin layer along the whole curved surface of said egg so as to become the background of said egg white pattern layer by sequentially exposing the whole face of the curved surface of said egg to a heating environment while rotating said egg after said yolk film tearing step, by floating the yolk in the egg white inside said eggshell, by attaching said yolk to said eggshell and by sequentially coagulating the uncoagulated yolk surrounding said egg white pattern layer and making contact with said egg white pattern layer near the inner face of said eggshell at the portion exposed to said heating environment during rotation and rocking or immediately after rotation and rocking.

6. A method for producing a patterned boiled egg set forth in claim 5, wherein said whole yolk skin layer forming step comprises:

a central portion yolk skin layer forming step for forming a central portion yolk skin layer along the curved surface of a portion corresponding to the central portion along the major axis of said curved surface of an egg by sequentially exposing the portion corresponding to the central portion along the major axis of said curved surface of said egg to an upper heating environment while rotating said egg around the major axis of said egg as a horizontal rotation center axis, and by sequentially coagulating the uncoagulated yolk floating in the egg white inside said eggshell and attached to said eggshell near the inner face of the upper portion of said eggshell exposed to the heating environment during said rotation;

an acute end portion yolk skin layer forming step for forming an acute end portion yolk skin layer along the curved surface of the acute end portion by exposing said acute end portion of said egg to an upper heating environment while rotating said egg around the major axis of said egg as an inclined vertical rotation center axis, and by coagulating the uncoagulated yolk floating in the egg white inside said eggshell at said acute end portion and attached to said eggshell; and an obtuse end portion yolk skin layer forming step for forming an obtuse end portion yolk skin layer along the curved surface of the obtuse end portion after said acute end portion yolk skin layer forming by boiling said egg in a heating medium, such as hot water, in a stationary posture wherein the major axis of said egg extends vertically and said obtuse end portion is positioned upward, and by coagulating the uncoagulated yolk floating in the egg white inside said eggshell at said obtuse end portion and attached to said eggshell.

7. A method for producing a patterned boiled egg set forth in claim 5, wherein said whole yolk skin layer forming step is a rotating/rocking whole yolk skin layer forming step for forming a whole yolk skin layer along the whole curved surface of an egg by boiling said egg while rotating and rocking said egg around the major axis of said egg used as its rotation and rocking center axis in a state wherein said egg is wholly dipped in a heating medium, such as hot water, and by coagulating the uncoagulated yolk, which is relatively easy to coagulate, floating near the inner face of the upper portion of said eggshell and attached to the eggshell, earlier than the uncoagulated egg white, which is relatively difficult to coagulate, sinking near the inner face of the lower portion of said eggshell and attached to said eggshell, during said rotation and rocking.

8. A patterned boiled egg comprising:

a whole egg white skin layer formed of an egg white coagulating along the whole curved surface of said boiled egg; and a yolk pattern layer formed of a yolk coagulating so as to draw a pattern against the background of said whole egg white skin layer while eliminating the yolk near said curved surface inside said whole egg white skin layer of said boiled egg.

9. A method for producing a patterned boiled egg including a series of production steps comprising:

a yolk film tearing step for tearing the yolk film of an egg;

a yolk positioning step for positioning an uncoagulated yolk after said yolk film tearing step by floating said uncoagulated yolk in the egg white inside the eggshell and by positioning said uncoagulated yolk so that said uncoagulated yolk makes contact with the inner face of said eggshell;

a yolk pattern layer forming step for forming a yolk pattern layer so as to draw a pattern after said yolk positioning step by heating a specific pattern area drawn on nearly one half of the curved surface of said eggshell area-selectively and concentrically, by coagulating said uncoagulated yolk on the inner face of said eggshell, and by removably attaching said yolk to the inner face of said eggshell;

a whole egg white skin layer forming step for forming a whole egg white skin layer along the whole curved surface of said egg after said yolk pattern forming step by boiling said egg while rotating and rocking said egg around the major axis of said egg used as its rotating/rocking center axis in a state wherein said egg is partially dipped in a heating medium, such as hot water, and by coagulating the uncoagulated egg white, which is relatively difficult to coagulate, sinking near the inner face of the lower portion of said eggshell dipped in said heating medium and attached to said eggshell, earlier than the uncoagulated yolk, which is relatively easy to coagulate, floating near the inner face of the upper portion of said eggshell not dipped in said heating medium and attached to said eggshell, during said rotation and rocking, so that said uncoagulated egg white surrounds said yolk pattern layer attached to the inner face of said eggshell, makes contact with said yolk pattern layer and becomes the background of said yolk pattern layer.

10. A method for producing a patterned boiled egg set forth in claim 9, wherein said yolk film tearing step is a rotating/stopping yolk film tearing step for tearing said yolk film, during the rotation of said egg around the major axis of said egg at a high speed, by immediately stopping said rotation and by applying a shearing force owing to the difference between the inertial force acting on the yolk at the central portion inside said eggshell and the inertial force acting on the egg white at the peripheral portion to said yolk film at the time of said immediate stop.

11. A patterned boiled egg comprising:
   a half egg white skin layer formed of an egg white coagulating along nearly one half of the curved surface of said boiled egg;
   a yolk pattern layer formed of a yolk coagulating so as to draw a pattern against the background of said half egg white skin layer while eliminating the egg white near said curved surface inside said half egg white skin layer of said boiled egg; and
   a half yolk skin layer formed of a yolk coagulating along nearly the other half of said curved surface of said boiled egg.

12. A method for producing a patterned boiled egg including a series of production steps comprising:
   a yolk film tearing step for tearing the yolk film of an egg;
   a yolk positioning step for positioning an uncoagulated yolk after said yolk film tearing step floating said uncoagulated yolk in the egg white inside the eggshell and by positioning said uncoagulated yolk so that said uncoagulated yolk makes contact with the inner face of said eggshell;
   a yolk pattern layer forming step for forming a yolk pattern layer so as to draw a pattern by heating a specific pattern area drawn on nearly one half of the curved surface of said eggshell after said yolk positioning step area-selectively and concentrically, by coagulating said uncoagulated yolk on the inner face of said eggshell, and by removably attaching said yolk to the inner face of said eggshell;
   a yolk/egg white positioning step for positioning said uncoagulated yolk by floating said uncongulated yolk in said egg white inside said eggshell so that said yolk makes contact with nearly the other half of the inner face of said eggshell of said egg after said yolk pattern layer forming step, and for positioning an uncoagulated egg white by sinking said egg white so that said uncoagulated egg white surrounds said yolk pattern layer attached to nearly one half of the inner face of said eggshell of said egg and makes contact with said yolk pattern layer;
   a half egg white skin layer forming step for forming a half egg white skin layer along nearly one half of the curved surface of said egg by boiling said egg after said yolk/egg white positioning step in its stationary posture as it is in a heating medium, such as hot water, and by coagulating said uncoagulated egg white so that said uncoagulated egg white sinks below said uncoagulated yolk floating inside said eggshell, surrounds said yolk pattern layer, makes contact with said yolk pattern layer and becomes the background of said yolk pattern layer; and
   a half yolk skin layer forming step, proceeding simultaneously with said half egg white skin layer forming step, for forming a half yolk skin layer along nearly the other half of the curved surface of said egg by boiling said egg after said yolk/egg white positioning step in its stationary posture as it is in a heating medium, such as hot water, and by coagulating said uncoagulated yolk floating in said egg white inside said eggshell.

13. A method for producing a patterned boiled egg set forth in claim 12, wherein said yolk film tearing step is a rotating/stopping yolk film tearing step for tearing said yolk film, during the rotation of said egg around the major axis of said egg at a high speed, by immediately stopping said rotation and by applying a shearing force owing to the difference between the inertial force acting on the yolk at the central portion inside said eggshell and the inertial force acting on the egg white at the peripheral portion to said yolk film at the time of said immediate stop.

14. A patterned boiled egg comprising:
   a half egg white skin layer formed of an egg white coagulating along nearly one half of the curved surface of said boiled egg;
   a yolk pattern layer formed of a yolk coagulating so as to draw a pattern against the background of said half egg white skin layer while eliminating the egg white near said curved surface inside said half egg white skin layer of said boiled egg;
   a half yolk skin layer formed of a yolk coagulating along nearly the other half of the curved surface of said boiled egg; and
   an egg white pattern layer formed of an egg white coagulating so as to draw a pattern against the background of said half yolk skin layer while eliminating the yolk near said curved surface inside said half yolk skin layer of said boiled egg.

15. A method for producing a patterned boiled egg including a series of production steps comprising:
   a yolk film tearing step for tearing the yolk film of an egg;
   a yolk positioning step for positioning an uncoagulated yolk after said yolk film tearing step by floating said uncoagulated yolk in the egg white inside the eggshell and by positioning said uncoagulated yolk so that said uncoagulated yolk makes contact with the inner face of said eggshell;
   a yolk pattern layer forming step for forming a yolk pattern layer so as to draw a pattern by heating a specific pattern area drawn on nearly one half of the curved surface of said eggshell after said yolk positioning step area-selectively and concentrically, by coagulating said uncoagulated yolk on the inner face of said eggshell, and by removably attaching said yolk to the inner face of said eggshell;

an egg white pattern layer forming step for forming an egg white pattern layer so as to draw a pattern by heating a specific pattern area drawn on nearly the other half of the curved surface of said eggshell after said yolk positioning step area-selectively and concentrically, by coagulating an uncoagulated egg white on the inner face of said eggshell, and by removably attaching said egg white to the inner face of said eggshell;

a yolk/egg white positioning step for positioning said uncoagulated yolk by floating said uncoagulated yolk in said egg white inside said eggshell so that said uncoagulated yolk surrounds said egg white pattern layer attached to nearly the other half of the inner face of said eggshell of said egg and makes contact with said egg white pattern layer after both said yolk pattern layer forming step and said egg white pattern layer forming step, and for positioning said uncoagulated egg white by sinking said uncoagulated egg white so that said uncoagulated egg white surrounds said yolk pattern layer attached to nearly one half of the inner face of said eggshell of said egg and makes contact with said yolk pattern layer;

a half egg white skin layer forming step for forming a half egg white skin layer along nearly one half of the curved surface of said egg by boiling said egg after said yolk/egg white positioning step in its stationary posture as it is in a heating medium, such as hot water, and by coagulating said uncoagulated egg white so that said uncoagulated egg white sinks below said uncoagulated yolk floating inside said eggshell, surrounds said yolk pattern layer, makes contact with said yolk pattern layer and becomes the background of said yolk pattern layer; and a half yolk skin layer forming step, proceeding simultaneously with said half egg white skin layer forming step, for forming a half yolk skin layer along nearly the other half of the curved surface of said egg by boiling said egg after said yolk/egg white positioning step in its stationary posture as it is in a heating medium, such as hot water, and by coagulating said uncoagulated yolk so that said uncoagulated yolk floats in said egg white inside said eggshell, surrounds said egg white pattern layer, makes contact with said egg white pattern layer and becomes the background of said yolk pattern layer.

16. A method for producing a patterned boiled egg set forth in claim 15, wherein said yolk film tearing step is a rotating/stopping yolk film tearing step for tearing said yolk film, during the rotation of said egg around the major axis of said egg at a high speed, by immediately stopping said rotation and by applying a shearing force owing to the difference between the inertial force acting on the yolk at the central portion inside said eggshell and the inertial force acting on the egg white at the peripheral portion to said yolk film at the time of said immediate stop.

* * * * *